US012460053B2

(12) United States Patent
Tatekawa et al.

(10) Patent No.: US 12,460,053 B2
(45) Date of Patent: Nov. 4, 2025

(54) METHOD FOR PRODUCING RESIN PARTICLES AND DRYER

(71) Applicant: FUJIFILM Business Innovation Corp., Tokyo (JP)

(72) Inventors: Takahisa Tatekawa, Kanagawa (JP); Kiyohiro Yamanaka, Kanagawa (JP); Shinichi Murase, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 672 days.

(21) Appl. No.: 17/871,459

(22) Filed: Jul. 22, 2022

(65) Prior Publication Data

US 2023/0143655 A1 May 11, 2023

(30) Foreign Application Priority Data

Nov. 5, 2021 (JP) ................................ 2021-181361

(51) Int. Cl.
*F26B 17/10* (2006.01)
*C08J 3/00* (2006.01)
*F26B 21/06* (2006.01)

(52) U.S. Cl.
CPC ............... *C08J 3/00* (2013.01); *F26B 17/107* (2013.01); *C08J 2325/06* (2013.01); *C08J 2333/08* (2013.01)

(58) Field of Classification Search
CPC .... F26B 17/107; F26B 17/105; F26B 17/106; F26B 3/06
See application file for complete search history.

(56) References Cited

U.S. PATENT DOCUMENTS 3,922,796 A * 12/1975 Stephanoff ............ F26B 17/105 432/2
4,214,375 A * 7/1980 Albus ................... F26B 17/105 34/317
4,489,503 A * 12/1984 Browne ................ F26B 17/105 34/368
2004/0049941 A1* 3/2004 Malachowski ....... F26B 17/105 34/576
2021/0017424 A1* 1/2021 Ishizuka .................... C09J 9/00
2021/0017429 A1* 1/2021 Ishizuka ................ B41M 5/504
2021/0018854 A1* 1/2021 Ishizuka ............ G03G 15/2021

FOREIGN PATENT DOCUMENTS

JP 4280516 B2 6/2009

OTHER PUBLICATIONS

Communication dated Aug. 19, 2025 in Japanese Application No. 2021-181361.

* cited by examiner

*Primary Examiner* — Karuna P Reddy
(74) *Attorney, Agent, or Firm* — Sughrue Mion, PLLC

(57) ABSTRACT

A method for producing resin particles includes drying resin particles in a wet state by passing, without circulating, the resin particles through a drying tube together with a first gas, the resin particles being ones that undergo pressure-induced phase transition. The drying tube has an inlet through which the resin particles are fed into the drying tube, at least one gas blowhole through which a second gas is blown over the resin particles passing through the drying tube, and an outlet through which the resin particles are ejected from the drying tube, and the second gas is blown out of the gas blowhole at a velocity of 50 m/s or more.

10 Claims, 3 Drawing Sheets

METHOD FOR PRODUCING RESIN PARTICLES AND DRYER

CROSS-REFERENCE TO RELATED APPLICATIONS

This application is based on and claims priority under 35 USC 119 from Japanese Patent Application No. 2021-181361 filed Nov. 5, 2021.

BACKGROUND

(i) Technical Field

The present disclosure relates to a method for producing resin particles and to a dryer used in this method for producing resin particles.

(ii) Related Art

Japanese Patent No. 4280516 discloses a method for producing toner particles. In this method, toner particles formed in a water-based dispersion medium are washed and dehydrated, and the resulting wet toner particles are dried with a dryer. The dryer uses a stream of gas at a velocity of 15 m/s or faster, and the drying is performed in such a manner that B<0.9 A, where A is the proportion of particles having a diameter of 0.6 μm to 2.0 μm in the size distribution by equivalent circular diameter of the toner particles before the drying, and B is that after the drying. In addition to this, 0.09<C/D<0.15, where C is the total cross-sectional area ($m^2$) of the pathways through which the dryer blows out the gas stream, and D is the cross-sectional area ($m^2$) of the largest part of the route of the gas stream. The dryer has a loop-shaped tube for gas-flow heating and multiple cyclone collectors, and the cyclone collectors are connected in parallel. There is no classifier between the loop-shaped tube for gas-flow heating and the cyclone collectors.

SUMMARY

Aspects of non-limiting embodiments of the present disclosure relate to a method for producing resin particles that includes drying resin particles in a wet state with a gas, the resin particles being ones that undergo pressure-induced phase transition. This method may help reduce the formation of coarse particles, compared with those in which the resin particles are dried by circulating them in a drying tube together with a gas and those in which the resin particles are dried by passing, without circulating, them through a drying tube together with a first gas, and the drying tube has gas blowhole(s) through which a second gas is blown over the resin particles passing through the drying tube, but the velocity of the second gas blown out is less than 50 m/s.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing resin particles, the method including drying resin particles in a wet state by passing, without circulating, the resin particles through a drying tube together with a first gas, the resin particles being ones that undergo pressure-induced phase transition, wherein: the drying tube has an inlet through which the resin particles are fed into the drying tube, at least one gas blowhole through which a second gas is blown over the resin particles passing through the drying tube, and an outlet through which the resin particles are ejected from the drying tube; and the second gas is blown out of the gas blowhole at a velocity of 50 m/s or more.

BRIEF DESCRIPTION OF THE DRAWINGS

Exemplary embodiments of the present disclosure will be described in detail based on the following figures, wherein.

DETAILED DESCRIPTION

Figure 1:
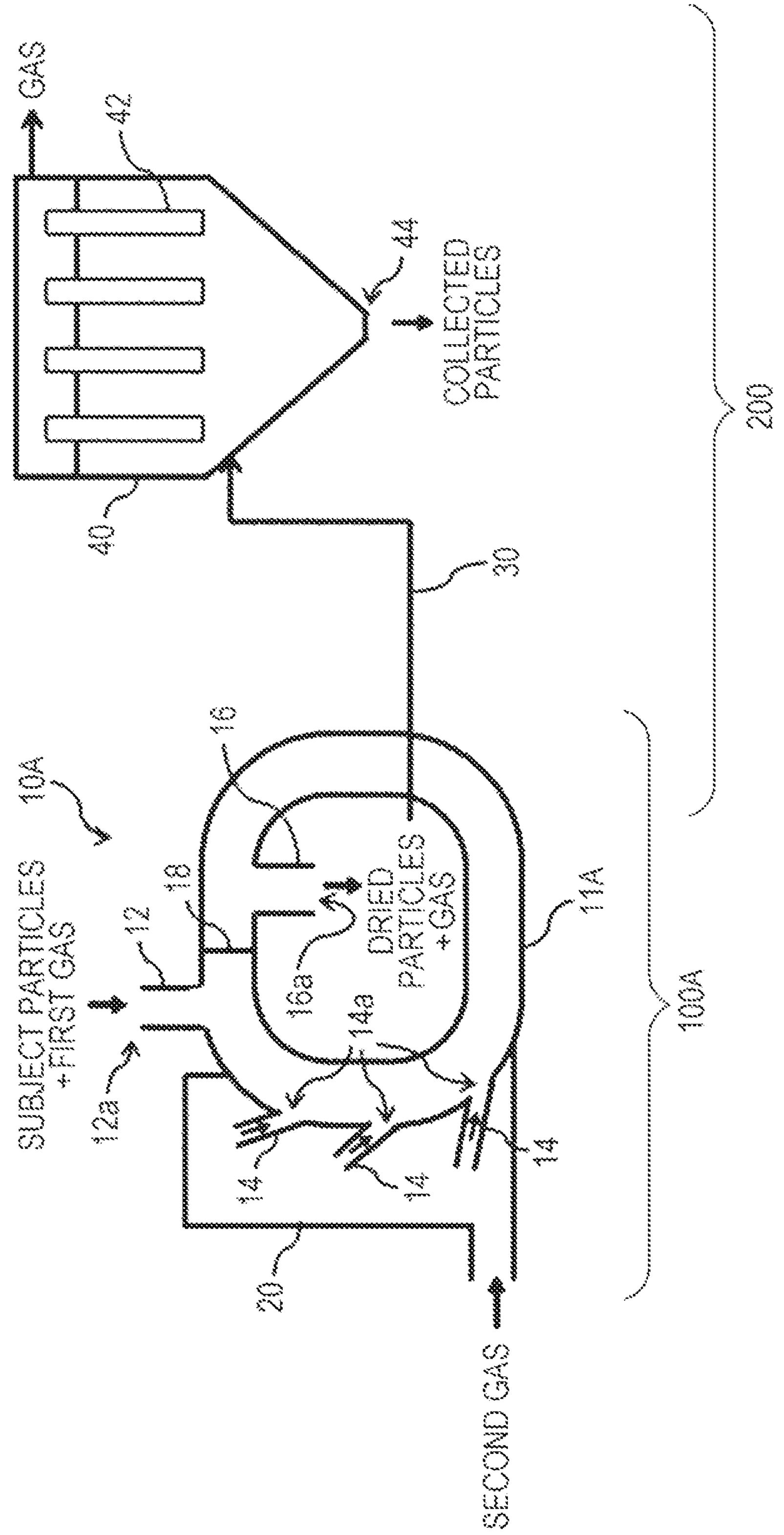
FIG. 1 is a schematic diagram illustrating the structure of an example of a drying unit and a collector of a dryer according to an exemplary embodiment of the present disclosure, with which drying and collection are carried out in a method according to an exemplary embodiment of the present disclosure for producing resin particles.

The following describes exemplary embodiments of the present disclosure. The following description and Examples are for illustrative purposes and do not limit the scope in which aspects of the present disclosure can be embodied.

Numerical ranges specified herein with "A-B," "between A and B," "(from) A to B," etc., represent inclusive ranges, which include the minimum A and the maximum B as well as all values in between.

The following description also includes series of numerical ranges. In such a series, the upper or lower limit of a numerical range may be substituted with that of another in the same series. The upper or lower limit of a numerical range, furthermore, may be substituted with a value indicated in the Examples section.

A gerund or action noun used in relation to a certain process or method herein does not always represent an independent action. As long as its purpose is fulfilled, the action represented by the gerund or action noun may be continuous with or part of another.

A description of an exemplary embodiment herein may make reference to drawing(s). The reference, however, does not mean what is illustrated is the only possible configuration of the exemplary embodiment. The size of elements in each drawing is conceptual; the relative sizes of the elements do not need to be as illustrated.

As used herein, the expression "(meth)acrylic" means the compound may be either "acrylic" or "methacrylic." A "(meth)acrylate," likewise, may be either an acrylate or methacrylate.

Production of Resin Particles

The production of resin particles may involve drying wet resin particles. One possible way to dry the wet resin particles is to circulate them in a loop-shaped drying tube together with a gas.

Applying resin particles that undergo pressure-induced phase transition to this way of drying as the wet resin particles, however, can cause the resin particles to fuse together due to their nature. This can result in the formation of coarse particles.

As used herein, the term coarse particles refers to fused aggregates of resin particles that do not pass through a 20-μm mesh test sieve as specified in JIS Z 8801-1: 2006.

After extensive research to address this, the inventors found the following about the drying of resin particles, in a wet state, that undergo pressure-induced phase transition.

That is, resin particles that undergo pressure-induced phase transition and are in a wet state are dried by passing, without circulating, them through a drying tube together with a first gas. The drying tube has at least one gas blowhole through which a second gas is blown over the resin particles passing through the drying tube. The second gas is blown out of the gas blowhole at a velocity of 50 m/s or more, or, alternatively, the difference Δ(V2−V1) is 40 m/s or more, where V1 is the velocity of the first gas passing through the drying tube, and V2 is the velocity of the second gas blown out of the gas blowhole. This may help reduce the formation of coarse particles.

First Exemplary Form of a Method for Producing Resin Particles/First Exemplary Form of a Dryer A first exemplary form of a method according to an exemplary embodiment of the present disclosure for producing resin particles is one that includes drying resin particles in a wet state by passing, without circulating, them through a drying tube together with a first gas, the resin particles being ones that undergo pressure-induced phase transition. The drying tube has an inlet through which the resin particles are fed into the drying tube, at least one gas blowhole through which a second gas is blown over the resin particles passing through the drying tube, and an outlet through which the resin particles are ejected from the drying tube. The second gas is blown out of the gas blowhole at a velocity of 50 m/s or more.

The first exemplary form of a method according to an exemplary embodiment of the present disclosure for producing resin particles, furthermore, is performed with a dryer (first exemplary embodiment of a dryer according to an exemplary embodiment of the present disclosure) having a drying unit that dries the resin particles, which undergo pressure-induced phase transition, in a wet state by passing, without circulating, them through a drying tube together with the first gas. The drying tube has the inlet through which the resin particles are fed into the drying tube, the at least one gas blowhole through which the second gas is blown over the resin particles passing through the drying tube, and the outlet through which the resin particles are ejected from the drying tube. The second gas is blown out of the gas blowhole at a velocity of 50 m/s or more.

In this context, the velocity of the second gas blown out of the gas blowhole represents the speed of the second gas flowing through the gas blowhole.

Second Exemplary Form of a Method for Producing Resin Particles/Second Exemplary Form of a Dryer A second exemplary form of a method according to an exemplary embodiment of the present disclosure for producing resin particles is one that includes drying resin particles in a wet state by passing, without circulating, them through a drying tube together with a first gas, the resin particles being ones that undergo pressure-induced phase transition. The drying tube has an inlet through which the resin particles are fed into the drying tube, at least one gas blowhole through which a second gas is blown over the resin particles passing through the drying tube, and an outlet through which the resin particles are ejected from the drying tube. The difference Δ(V2−V1) is 40 m/s or more, where V1 is the velocity of the first gas passing through the drying tube, and V2 is the velocity of the second gas blown out of the gas blowhole.

The second exemplary form of a method according to an exemplary embodiment of the present disclosure for producing resin particles, furthermore, is performed with a dryer (second exemplary embodiment of a dryer according to an exemplary embodiment of the present disclosure) having a drying unit that dries the resin particles, which undergo pressure-induced phase transition, in a wet state by passing, without circulating, them through a drying tube together with the first gas. The drying tube has the inlet through which the resin particles are fed into the drying tube, the at least one gas blowhole through which the second gas is blown over the resin particles passing through the drying tube, and the outlet through which the resin particles are ejected from the drying tube. The difference Δ(V2−V1) is 40 m/s or more, where V1 is the velocity of the first gas passing through the drying tube, and V2 is the velocity of the second gas blown out of the gas blowhole.

In this context, the velocity V1 of the first gas passing through the drying tube is the speed of the first gas flowing inside the drying tube immediately before being mixed with the second gas, and the velocity V2 of the second gas blown out of the gas blowhole is the speed of the second gas flowing through the gas blowhole.

Third Exemplary Form of a Dryer

A third exemplary form of a dryer according to an exemplary embodiment of the present disclosure is one that includes a drying unit that dries resin particles in a wet state by passing, without circulating, them through a drying tube together with a first gas, the resin particles being ones that undergo pressure-induced phase transition. The drying tube includes a loop of piping, a feeding section through which the resin particles are fed into the loop of piping, a gas-blowing section through which a second gas is blown over the resin particles passing through the loop of piping, an ejection section through which the resin particles are ejected from the loop of piping, and a stopper plate that prevents the resin particles from circulating in the loop of piping.

In the present disclosure, simply mentioning "the method according to an exemplary embodiment of the present disclosure for producing resin particles" without specific details means the statement applies to both of the foregoing first and second exemplary forms.

Likewise, simply mentioning "the dryer according to an exemplary embodiment of the present disclosure" without specific details means the statement applies to all of the foregoing first, second, and third exemplary forms.

In the following, furthermore, the term "subject particles" may be used to describe resin particles that undergo pressure-induced phase transition and are in a wet state, and the term "pressure-responsive particles" may be used when describing resin particles that undergo pressure-induced phase transition themselves, whether wet or dry.

In the method according to an exemplary embodiment of the present disclosure for producing resin particles and in the use of the dryer according to an exemplary embodiment of the present disclosure, the subject particles are passed, without being circulated, through a drying tube together with a first gas. The expression "without being circulated" in this context means the subject particles move with a stream of the first gas (i.e., gas stream) and pass through inside the drying tube from the inlet to the outlet only once. It should be noted that the subject particles can stay or flow backwards inside the drying tube "without being circulated." By virtue of this one-time passage of the subject particles through a drying tube together with a first gas before being ejected from the tube, the dried particles in aspects of the present disclosure do not collide with wet ones as in circulating the wet particles in a loop-shaped drying tube together with a gas. Resin particles that undergo pressure-induced phase transition (i.e., pressure-responsive particles) can fuse together through self-collision, and the fused particles can form coarse particles. The inventors believe the method according to an exemplary embodiment of the present disclosure for producing resin particles, in which the subject particles are passed, without being circulated, through a drying tube together with a first gas, may help effectively reduce the formation of coarse particles caused by collision between dried particles and wet ones.

The following describes the dryer according to an exemplary embodiment of the present disclosure, with which drying is carried out in the method according to an exemplary embodiment of the present disclosure for producing resin particles.

FIG. 1 is a schematic diagram illustrating the structure of an example of a drying unit and a collector of the dryer according to an exemplary embodiment of the present disclosure, with which drying and collection are carried out in the method according to an exemplary embodiment of the present disclosure for producing resin particles.

The dryer illustrated in FIG. 1 includes a drying unit 100A that dries subject particles by passing, without circulating, them through a drying tube together with a first gas, and also includes a collector 200 at which the subject particles ejected from the drying tube are collected.

It should be noted that the dryer in FIG. 1 has a drying tube 10A according to the third exemplary form of an exemplary embodiment of the present disclosure.

As illustrated in FIG. 1, the drying unit 100A includes a drying tube 10A formed by a loop of piping closed inside with a stopper plate so that the subject particles will not circulate in the loop of piping. The drying tube 10A includes a loop of piping 11A, a feeding section 12 through which the subject particles are fed into the loop of piping 11A together with a first gas, second-gas nozzles (example of a gas-blowing section) 14 through which a second gas is blown over the subject particles passing through the loop of piping 11A, an ejection section 16 through which the subject particles are ejected from the loop of piping 11A together with a gas, and a stopper plate 18 that prevents the subject particles from circulating in the loop of piping 11A. That is, the drying tube 10A is formed by a loop of piping 11A having or fitted with a feeding section 12, second-gas nozzles 14, an ejection section 16, and a stopper plate 18.

In the context of the drying tube 10A, the "inlet through which the resin particles are fed into the drying tube" is the inlet 12*a*, which is the opening of the feeding section 12. The "at least one gas blowhole through which a second gas is blown over the resin particles passing through the drying tube" is the gas blowholes 14*a*, which are the openings of the second-gas nozzles (example of a gas-blowing section) 14. The "outlet through which the resin particles are ejected from the drying tube" is the outlet 16*a*, which is the opening of the ejection section 16.

The drying unit 100A in FIG. 1 has three gas blowholes 14*a* arranged in the direction from the inlet 12*a* to the outlet 16*a* of the drying tube 10A, and the three gas blowholes 14*a* are coupled one-to-one with three second-gas nozzles 14. The drying unit 100A also has a second-gas feeding section 20 covering the three gas nozzles 14.

To be fed to the inlet 12*a*, the subject particles are transported by a feeder, not illustrated. The subject particles transported to the inlet 12*a* are automatically sucked in, in the direction of the arrow in FIG. 1, according to the balance between aspiration (specifically, that of gases) from the ejection section 16 (specifically, the outlet 16*a*) side of the drying tube 10A and the blowing out of the second gas through the gas blowholes 14*a* into the drying tube 10A.

The second gas fed to the second-gas feeding section 20, furthermore, is conditioned in terms of temperature and humidity through a dehumidifier, a blower, a heater, etc., all not illustrated. For example, a gas dehumidified through a dehumidifier is pushed out by a blower and then heated by a heater to be fed to the second-gas feeding section 20 as a hot and dry second gas.

The subject particles fed into the drying tube 10A through the inlet 12*a* together with the first gas then flow toward the outlet 16*a* intermittently or continuously, forming assemblies (i.e., masses of pressure-responsive particles in a wet state). In this exemplary configuration of the dryer, the first gas forms a stream that goes through inside the drying tube 10A from the inlet 12*a* to the outlet 16*a* (hereinafter also referred to as the first stream). On this first stream, the subject particles pass through the drying tube 10A.

It should be noted that the drying tube 10A is formed by a loop of piping 11A, but the inside of the loop of piping 11A is closed with the stopper plate 18. By virtue of this, the subject particles pass through the drying tube 10A together with the first gas, without circulating.

The subject particles (specifically, assemblies of the subject particles) moving inside the drying tube 10A in the direction of the gravitational force are hit by the second gas blown out of the three gas blowholes 14*a*. The second gas hitting the assemblies of the subject particles accelerates the drying of the subject particles while disintegrating the assemblies. The subject particles hit by the second gas (specifically, each of the subject particles disintegrated from one another) go through the drying tube 10A in that state, dry and lose their water content by doing so, and are ejected through the outlet 16*a* together with a gas containing the first and second gases (i.e., on a gas stream formed by the first and second gases). Overall, the subject particles fed continuously or intermittently into the drying tube 10A are disintegrated by the second gas, transfer the water therein into the first and second gases by moving on a stream of the first and second gases, and are ejected through the outlet 16*a* as dried particles.

Configured as such, the drying unit 100A performs continuous drying of the subject particles.

As illustrated in FIG. 1, furthermore, the collector 200 is coupled to the outlet 16*a* of the drying tube 10A and includes transfer piping 30 through which the dried particles and gas ejected from the outlet 16*a* of the drying tube 10A and a bag filter 40 that separates the dried particles and gas transferred through the transfer piping 30 and collects the dried particles.

The dried particles and gas ejected from the outlet 16*a* of the drying tube 10A are transferred to the bag filter 40 through the transfer piping 30.

The dried particles transferred to the bag filter 40 are trapped by filtration bags 42. The gas that has flown into the bag filter 40 together with the dried particles passes through the filtration bags 42 and is ejected through an outlet to which the intake side of an exhaust blower, not illustrated, is coupled. In this way, solid-gas separation takes place between the dried particles and the gas at the bag filter 40.

The dried particles trapped through gas-flow filtration at the filtration bags 42 of the bag filter 40 may further lose their water content because they are exposed to a gas stream while being caught on the surface of the filtration bags 42. As can be seen from this, further drying of the dried particles at a bag filter 40, having filtration bags 42, is permitted. The dried particles trapped through gas-flow filtration at the filtration bags 42 are ejected through a collection port 44 at the bottom of the bag filter 40 and collected.

In the method according to an exemplary embodiment of the present disclosure for producing resin particles or as a component of the dryer according to an exemplary embodiment of the present disclosure, the drying unit does not need to be structured like the drying unit 100A in FIG. 1. The drying unit in the method according to an exemplary embodiment of the present disclosure for producing resin particles or as a component of the dryer according to an exemplary embodiment of the present disclosure may be a drying unit 100B including a drying tube 10B like that in FIG. 2 or may be a drying unit 100C including a drying tube 10C like that in FIG. 3.

Figure 2:
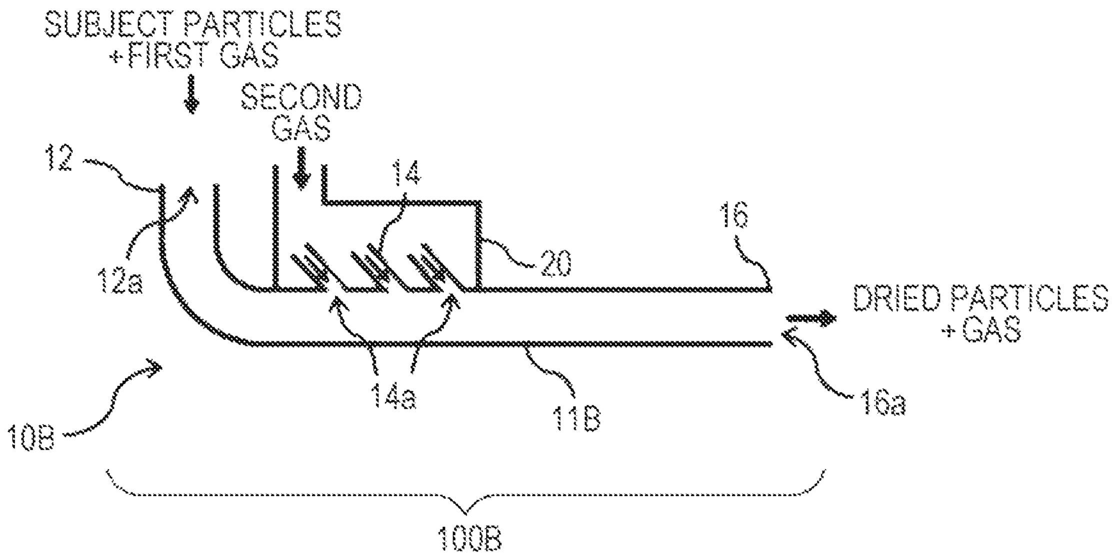
FIG. 2 is a schematic diagram illustrating the structure of another example of a drying unit of a dryer according to an exemplary embodiment of the present disclosure, with which drying is carried out in a method according to an exemplary embodiment of the present disclosure for producing resin particles.

The drying unit 100B illustrated in FIG. 2 is different from the drying unit 100A in FIG. 1 only in that it includes a drying tube 10B structurally different from the drying tube 10A. The drying tube 10B has an inlet 12*a* through which the subject particles are fed into the drying tube 10B together with a first gas, gas blowholes 14*a* through which a second gas is blown over the subject particles passing through the drying tube 10B, and an outlet 16*a* through which the subject particles are ejected from the drying tube 10B together with a gas. This drying tube 10B is formed by a non-looped piece of piping 11B having a feeding section 12 and an ejection section 16 and fitted with gas nozzles 14. Like the drying unit 100A in FIG. 1, the drying unit 100B has three gas blowholes 14*a* arranged in the direction from the inlet 12*a* to the outlet 16*a* of the drying tube 10B, and the three gas blowholes 14*a* are coupled one-to-one with three second-gas nozzles 14. The drying unit 100B also has a second-gas feeding section 20 covering the three gas nozzles 14.

The subject particles are automatically sucked into the drying tube 10B, in the direction of the arrow in FIG. 2, together with the first gas according to the balance between aspiration (specifically, that of gases) from the ejection section 16 (specifically, the outlet 16*a*) side of the drying tube 10B and the blowing out of the second gas through the gas blowholes 14*a* into the drying tube 10B. The subject particles fed into the drying tube 10B through the inlet 12*a* together with the first gas then flow toward the outlet 16*a* intermittently or continuously, forming assemblies (i.e., masses of pressure-responsive particles in a wet state). In this exemplary configuration of the dryer, too, the subject particles pass through the drying tube 10B, without circulating, on a stream of the first gas that goes through inside the drying tube 10B from the inlet 12*a* to the outlet 16*a* (i.e., the first stream).

The subject particles (specifically, assemblies of the subject particles) moving inside the drying tube 10B in the direction of the gravitational force are hit by the second gas blown out of the three gas blowholes 14*a*. The second gas hitting the assemblies of the subject particles accelerates the drying of the subject particles while disintegrating the assemblies. The subject particles hit by the second gas (specifically, each of the subject particles disintegrated from one another) dry by going through the drying tube 10B in that state and are ejected through the outlet 16*a* together with a gas containing the first and second gases (i.e., on a gas stream formed by the first and second gases).

Configured as such, the drying unit 100B performs continuous drying of the subject particles.

Figure 3:
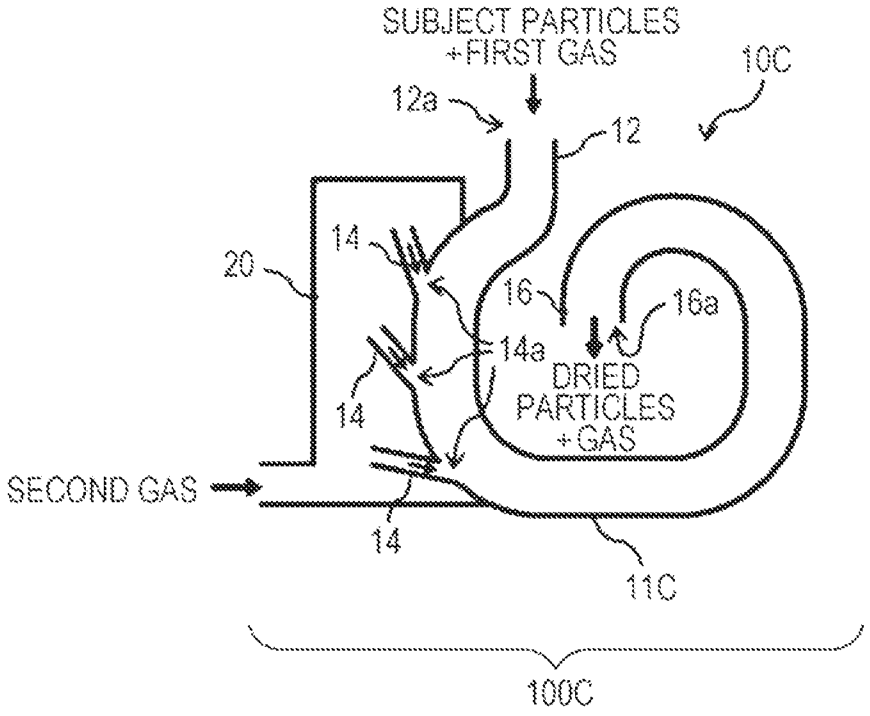
FIG. 3 is a schematic diagram illustrating the structure of another example of a drying unit of a dryer according to an exemplary embodiment of the present disclosure, with which drying is carried out in a method according to an exemplary embodiment of the present disclosure for producing resin particles.

The drying unit 100C illustrated in FIG. 3 is different from the drying unit 100A in FIG. 1 only in that it includes a drying tube 10C structurally different from the drying tube 10A. The drying tube 10C has an inlet 12*a* through which the subject particles are fed into the drying tube 10C together with a first gas, gas blowholes 14*a* through which a second gas is blown over the subject particles passing through the drying tube 10C, and an outlet 16*a* through which the subject particles are ejected from the drying tube 10C together with a gas. This drying tube 10C is formed by a non-looped piece of piping 11C having a feeding section 12 and an ejection section 16 and fitted with gas nozzles 14. Like the drying unit 100A in FIG. 1, the drying unit 100C has three gas blowholes 14*a* arranged in the direction from the inlet 12*a* to the outlet 16*a* of the drying tube 10C, and the three gas blowholes 14*a* are coupled one-to-one with three second-gas nozzles 14. The drying unit 100C also has a second-gas feeding section 20 covering the gas nozzles 14.

The subject particles are automatically sucked into the drying tube 10C, in the direction of the arrow in FIG. 3, together with the first gas according to the balance between aspiration (specifically, that of gases) from the ejection section 16 (specifically, the outlet 16*a*) side of the drying tube 10C and the blowing out of the second gas through the gas blowholes 14*a* into the drying tube 10C. The subject particles fed into the drying tube 10C through the inlet 12*a* together with the first gas then flow toward the outlet 16*a* intermittently or continuously, forming assemblies (i.e., masses of pressure-responsive particles in a wet state). In this exemplary configuration of the dryer, too, the subject particles pass through the drying tube 10C, without circulating, on a stream of the first gas that goes through inside the drying tube 10C from the inlet 12*a* to the outlet 16*a* (i.e., the first stream).

The subject particles (specifically, assemblies of the subject particles) moving inside the drying tube 10C in the direction of the gravitational force are hit by the second gas blown out of the three gas blowholes 14*a*. The second gas hitting the assemblies of the subject particles accelerates the drying of the subject particles while disintegrating the assemblies. The subject particles hit by the second gas (specifically, each of the subject particles disintegrated from one another) dry by going through the drying tube 10C in that state and are ejected through the outlet 16*a* together with a gas containing the first and second gases (i.e., on a gas stream formed by the first and second gases).

Configured as such, the drying unit 100C performs continuous drying of the subject particles.

In the method according to an exemplary embodiment of the present disclosure for producing resin particles or as a component of the dryer according to an exemplary embodiment of the present disclosure, the collector does not need to be structured like the collector 200 in FIG. 1. The collector in the method according to an exemplary embodiment of the present disclosure for producing resin particles or as a component of the dryer according to an exemplary embodiment of the present disclosure may include a cyclone instead of the bag filter or may include both a bag filter and a cyclone.

To ensure reduced formation of coarse particles, the collector may include a bag filter as the only way of solid-gas separation between the dried particles and the gas like that of the dryer illustrated in FIG. 1. The drying units 100B and 100C illustrated in FIGS. 2 and 3, too, may be combined with a collector including a bag filter like the collector 200 illustrated in FIG. 1.

In the first exemplary form of the method according to an exemplary embodiment of the present disclosure for producing resin particles and that of the dryer according to an exemplary embodiment of the present disclosure, the second gas is blown out of the gas blowhole at a velocity (V2) of 50 m/s or more. Blowing out the second gas at such a velocity may help disintegrate the assemblies of the subject particles efficiently and accelerate the drying of the subject particles at the same time.

The velocity of the second gas blown out of the gas blowhole may be 80 m/s or more to ensure reduced formation of coarse particles. Preferably, the velocity V2 is 100 m/s or more, more preferably 120 m/s or more.

As for the upper limit, the velocity of the second gas blown out of the gas blowhole may be 300 m/s or less for facility load reasons and to ensure reduced formation of coarse particles. Preferably, the velocity V2 is 250 m/s or less.

In the second exemplary form of the method according to an exemplary embodiment of the present disclosure for producing resin particles and that of the dryer according to an exemplary embodiment of the present disclosure and in the third exemplary form of the dryer, too, the velocity of the second gas blown out of the gas blowhole may be 50 m/s or more to ensure reduced formation of coarse particles. Preferably, the velocity V2 is 80 m/s or more, more preferably 100 m/s or more, even more preferably 120 m/s or more.

As for the upper limit, the velocity of the second gas blown out of the gas blowhole may be 300 m/s or less for facility load reasons and to ensure reduced formation of coarse particles. Preferably, the velocity V2 is 250 m/s or less.

In the second exemplary form of the method according to an exemplary embodiment of the present disclosure for producing resin particles and that of the dryer according to an exemplary embodiment of the present disclosure, furthermore, the difference Δ(V2−V1) is 40 m/s or more, where V1 is the velocity of the first gas passing through the drying tube (i.e. the velocity of the first stream), and V2 is the velocity of the second gas blown out of the gas blowhole. Creating such a difference in velocity may help disintegrate the assemblies of the subject particles efficiently and accelerate the drying of the subject particles at the same time.

The difference Δ(V2−V1) may be 70 m/s or more, preferably 90 m/s or more.

As for the upper limit, the difference Δ(V2−V1) may be 290 m/s or less for facility load reasons and to ensure reduced formation of coarse particles. Preferably, the difference Δ(V2−V1) is 240 m/s or less.

In this exemplary form, the velocity V1 of the first gas passing through the drying tube may be 0.01 m/s or more and 10 m/s or less, preferably 0.02 m/s or more and 5 m/s or less.

In the first exemplary form of the method according to an exemplary embodiment of the present disclosure for producing resin particles and that of the dryer according to an exemplary embodiment of the present disclosure and in the third exemplary form of the dryer, too, this difference Δ(V2−V1) may be 40 m/s or more. Preferably, the difference Δ(V2−V1) is 70 m/s or more, more preferably 90 m/s or more.

As for the upper limit, the difference Δ(V2−V1) may be 290 m/s or less for facility load reasons and to ensure reduced formation of coarse particles. Preferably, the difference Δ(V2−V1) is 240 m/s or less.

In these exemplary forms, too, the velocity V1 of the first gas passing through the drying tube may be 0.01 m/s or more and 10 m/s or less, preferably 0.02 m/s or more and 5 m/s or less.

In the method according to an exemplary embodiment of the present disclosure for producing resin particles or as a component of the dryer according to an exemplary embodiment of the present disclosure, the drying tube may have any number of gas blowholes; the tube only needs to have at least one blowhole. To ensure reduced formation of coarse particles and effective drying of the subject particles, the drying tube may have two or more gas blowholes, preferably three or more.

As for the upper limit, the number of gas blowholes the drying tube has may be ten or fewer for facility load reasons. Preferably, the tube has eight or fewer gas blowholes.

The gas blowhole of the drying tube may be located within a distance of 0.6 times the span of the tube (i.e., the length of the line that passes through the center of the tube from the inlet to the outlet) from the inlet. If there are multiple gas blowholes, all of them may be located within a distance of 0.6 times the span of the tube from the inlet, preferably with adjacent ones spaced with a distance equal to or larger than their maximum diameter d therebetween.

If the drying tube, in the method according to an exemplary embodiment of the present disclosure for producing resin particles or as a component of the dryer according to an exemplary embodiment of the present disclosure, has two or more gas blowholes, the second gas may be blown at a velocity of 50 m/s or more out of each of the two or more gas blowholes. Preferably, the velocity is 80 m/s or more, more preferably 100 m/s, for each blowhole.

It should be noted that if the drying tube has two or more gas blowholes, the velocity of the second gas blown out of each of the two or more gas blowholes may be equal or may be different.

As for the upper limit, the velocity of the second gas blown out of two or more gas blowholes may be 300 m/s or less for facility load reasons and to ensure reduced formation of coarse particles. Preferably, the velocity is 250 m/s or less.

In the method according to an exemplary embodiment of the present disclosure for producing resin particles and in the use of the dryer according to an exemplary embodiment of the present disclosure, it may be that $Q2/(Q1+Q2) \geq 0.9$, where Q1 is the flow rate of the first gas through the drying tube, and Q2 is the total flow rate of the second gas through the gas blowhole(s), if the focus is on reducing the formation of coarse particles. Preferably, $Q2/(Q1+Q2) \geq 0.95$.

In this context, the velocity V1 of the first gas passing through the drying tube (velocity V1 of the first stream), the flow rate Q1 of the same first gas, and the velocity V2 and the flow rate Q2 of the second gas blown out of the gas blowhole(s) can be determined as follows.

First, the blower for the feeding of the second gas is turned on, and the gas in the drying tube is pulled from the outlet side (for example by turning on an exhaust blower at the collector). In that state, the flow rate of the first gas at the inlet of the drying tube and that of the second gas at the gas blowhole(s) are measured using Pitot-tube flow meters with no subject particles fed.

Figure 4:
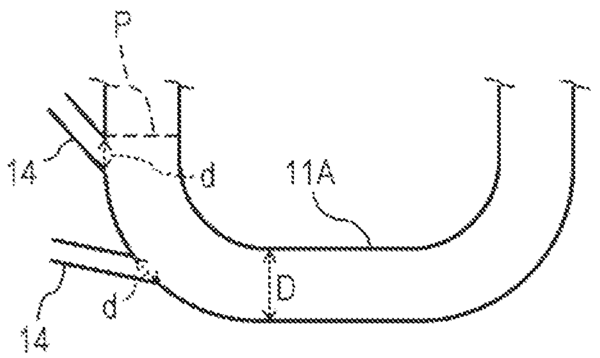
FIG. 4 is a partially enlarged view of the structure of a drying tube and gas blowholes, given for the description of the maximum diameter D of the tube and that d of the gas blowholes.

The velocity V1 of the first gas passing through the drying tube is given by dividing the measured flow rate of the first gas at the inlet of the drying tube by the cross-sectional area of the portion of the drying tube where the first gas is about to be mixed with the second gas (specifically, the cross-sectional area of the point indicated by dotted line P in FIG. 4, immediately after which the drying tube 10A, or the loop of piping 11A, has one of its gas blowholes 14*a*).

The flow rate Q1 of the first gas passing through the drying tube is the measured flow rate of the first gas at the inlet of the drying tube.

The velocity V2 of the second gas blown out of the gas blowhole(s) is given by dividing the measured flow rate of the second gas at the gas blowhole(s) in the drying tube by the total area of the gas blowhole(s) in the drying tube. If there are multiple gas blowholes, the arithmetic mean of the velocity determined for each of them is used as the "velocity V2 of the second gas blown out of the gas blowhole(s)."

The total flow rate Q2 of the second gas blown out of the gas blowhole(s) is the total of the measured flow rate(s) of the second gas at the gas blowhole(s) in the drying tube. That is, if there are multiple gas blowholes, the total of the measured flow rate at each of them is used as the "total flow rate Q2 of the second gas blown out of the gas blowhole(s)."

If the drying unit 100A, 100B, or 100C has a second-gas feeding section 20 as illustrated in FIGS. 1 to 3, the flow rate of the second gas at the inlet of the second-gas feeding section 20 may be used instead of the flow rate of the second gas at the gas blowhole(s) in the drying tube to determine the "velocity V2 of the second gas blown out of the gas blowhole(s)." Likewise, the flow rate of the second gas at the inlet of the second-gas feeding section 20 may be used as the "total flow rate Q2 of the second gas blown out of the gas blowhole(s)."

In the method according to an exemplary embodiment of the present disclosure for producing resin particles and in the use of the dryer according to an exemplary embodiment of the present disclosure, the gas inside the drying tube may move faster as it goes through the tube. Specifically, at the inlet of the drying tube the first gas is the only gas fed there, but as this first gas moves inside the tube, the second gas is blown over the subject particles and joins the first gas. The velocity of the resulting gas, containing the first and second gases, may be faster than that of the first gas alone (i.e., the velocity V1 of the first gas passing through the drying tube). The accelerated velocity, or the velocity of the gas containing the first and second gases, may be close to the velocity V2 of the second gas blown out.

This acceleration of the gas inside the drying tube as it goes through the tube can be achieved by customizing parameters like the flow rate Q1 of the first gas through the drying tube, the total flow rate Q2 of the second gas through the gas blowhole(s), the velocity V1 of the first gas passing through the drying tube, the velocity V2 of the second gas blown out of the gas blowhole(s), and the number, location, and direction of the gas blowhole(s) as needed.

In the method according to an exemplary embodiment of the present disclosure for producing resin particles and for the dryer according to an exemplary embodiment of the present disclosure, it may be that $d/D \leq 0.25$, where D is the maximum diameter of the drying tube, and d is the maximum diameter of the gas blowhole(s). Preferably, $d/D \leq 0.20$.

It may be that, furthermore, $0.05 \leq d/D$ for facility load reasons and to ensure reduced formation of coarse particles. Preferably, $0.1 \leq d/D$.

In this context, the maximum diameter D of the drying tube is, as illustrated in FIG. 4, the inner diameter of the broadest point of the portion of the drying tube (e.g., the drying tube 10A in FIG. 4) through which the following three pass: the subject particles, the first gas, and the second gas. The maximum diameter d of the gas blowhole(s) is the maximum inner diameter of the blowhole(s) (the length of the longest line segment between any two points on the outline of the gas blowhole(s)).

The maximum diameter D of the drying tube and that d of the gas blowhole(s) are measured using a tape measure or caliper. The maximum diameter D of the drying tube may be the specified maximum diameter of the piping.

If there are multiple gas blowholes, the arithmetic mean of the measured maximum diameter of each of them is used as the "maximum diameter d of the gas blowhole(s)."

In the method according to an exemplary embodiment of the present disclosure for producing resin particles and in the use of the dryer according to an exemplary embodiment of the present disclosure, the temperature T1 of the second gas blown out of the gas blowhole(s) may be 50° C. or above and 70° C. or below, and the temperature T2 inside the collector may be 20° C. or above and 40° C. or below at the same time, to ensure reduced formation of coarse particles. Preferably, the temperature T1 is 55° C. or above and 65° C. or below, and the temperature T2 is 30° C. or above and 40° C. or below at the same time.

The temperature T1 of the second gas can be controlled by adjusting the temperature to which the second gas is heated. The temperature T2 inside the collector may be controlled by controlling it directly, by customizing parameters like the quantity, rate of feeding, and water content of the subject particles, or by a combination thereof.

In this context, the temperature T1 of the second gas blown out of the gas blowhole(s) and the temperature T2 inside the collector can be determined as follows.

First, the blower for the feeding of the first gas and then that for the feeding of the second gas are turned on, and the gas inside the drying tube is pulled from the outlet side. In that state, the temperature of the second gas at the gas blowhole(s) in the drying tube and that inside the collector are measured using thermocouples with the subject particles fed.

If there are multiple gas blowholes, the arithmetic mean of the measured temperature at each of them is the "temperature T1 of the second gas blown out of the gas blowhole(s)."

If the drying unit 100A, 100B, or 100C has a second-gas feeding section 20 as illustrated in FIGS. 1 to 3, the temperature of the second gas at the inlet of the second-gas feeding section 20 may be used instead of the temperature of the second gas at the gas blowhole(s) in the drying tube to determine the temperature T1 of the second gas blown out of the gas blowhole(s).

As stated, in the method according to an exemplary embodiment of the present disclosure for producing resin particles or as a component of the dryer according to an exemplary embodiment of the present disclosure, the collector may include a bag filter that provides solid-gas separation between the dried particles and the gas. The linear velocity of the gas passing through the filtration bags in the bag filter may be 0.1 m/s or less for further reduction of the formation of coarse particles. Preferably, this linear velocity is 0.05 m/s or less.

As for the lower limit, the linear velocity of the gas passing through the filtration bags in the bag filter can be 0.005 m/s or more, for example for facility cost reasons.

In this context, the linear velocity of the gas passing through the filtration bags in the bag filter is given by dividing the sum of the flow rates Q1 and Q2 by the total filtration area of the filtration bags.

In the method according to an exemplary embodiment of the present disclosure for producing resin particles and in the use of the dryer according to an exemplary embodiment of the present disclosure, the resin particles may be dried to a water content of less than 10% by mass. Preferably, the final water content is 2% by mass or less.

Gases

The gases used in the method according to an exemplary embodiment of the present disclosure for producing resin particles or with the dryer according to an exemplary embodiment of the present disclosure can be air. The gases may contain an inert gas, such as nitrogen, or may even totally be inert gases.

Subject Particles

The following describes the subject particles, i.e., the particles applied to the method according to an exemplary embodiment of the present disclosure for producing resin particles and the dryer according to an exemplary embodiment of the present disclosure.

As stated, the subject particles are resin particles that undergo pressure-induced phase transition and are in a wet state.

Being in a wet state means, for example, having a water content of 10% by mass or more. Given that the formation of coarse particles that may be reduced herein is that caused by stress during dehydration, the water content of the subject particles may be 15% by mass or more, preferably 20% by mass or more. The water content of the subject particles may be 50% by mass or less for drying efficiency reasons, preferably 40% by mass or less. It is, therefore, preferred that the water content of the subject particles be 20% by mass or more and 40% by mass or less.

In this context, the water content is given by the mass of water in the wet particles/the mass of the wet particles×100.

The subject particles, furthermore, are resin particles that undergo pressure-induced phase transition, or, in other words, pressure-responsive particles. The method according to an exemplary embodiment of the present disclosure for producing resin particles and the dryer according to an exemplary embodiment of the present disclosure may help reduce the formation of coarse particles in the subject particles, even if the subject particles are pressure-responsive ones.

Pressure-Responsive Particles

Pressure-responsive particles are particles that undergo phase transition under applied pressure. Specifically, particles are pressure-responsive if:

$$8° \text{ C.} \leq T_A - T_B \quad (1)$$

where $T_A$ is the temperature at which the particles exhibit a viscosity of 10,000 Pa·s under a pressure of 1 MPa, and $T_B$ is the temperature at which the resin particles exhibit a viscosity of 10,000 Pa·s under a pressure of 10 MPa.

The temperature difference ($T_A$−$T_B$) may be 10° C. or more because in that case the pressure-responsive particles may be prone to pressure-induced phase transition. Preferably, this temperature difference is 15° C. or more, more preferably 20° C. or more. As for the upper limit, the temperature difference ($T_A$−$T_B$) may be 120° C. or less, preferably 100° C. or less, more preferably 80° C. or less.

The temperature $T_A$ may be 140° C. or below, preferably 130° C. or below, more preferably 120° C. or below, even more preferably 115° C. or below. As for the lower limit, the temperature $T_A$ may be 60° C. or above, preferably 80° C. or above, even more preferably 85° C. or above.

The temperature $T_B$ may be 40° C. or above, preferably 50° C. or above, more preferably 60° C. or above. As for the upper limit, the temperature $T_B$ may be 85° C. or below.

A measure of the tendency of pressure-responsive particles to undergo pressure-induced phase transition is a temperature difference ($T_A$−$T_C$), where $T_A$ is the temperature at which the particles exhibit a viscosity of 10,000 Pa·s under a pressure of 1 MPa, and $T_C$ is the temperature at which the particles exhibit a viscosity of 10,000 Pa·s under a pressure of 4 MPa, and the temperature difference ($T_A$−$T_C$) may be 5° C. or more. Pressure-responsive particles may have a temperature difference ($T_A$−$T_C$) of 5° C. or more because in that case they may be prone to pressure-induced phase transition. Preferably, this temperature difference is 10° C. or more.

Usually, the temperature difference ($T_A$−$T_C$) is 25° C. or below.

Pressure-responsive particles may have a temperature $T_C$, at which they exhibit a viscosity of 10,000 Pa·s under a pressure of 4 MPa, of 90° C. or below because this may help ensure the temperature difference ($T_A$−$T_C$) is 5° C. or more. Preferably, the temperature $T_C$ is 85° C. or below, more preferably 80° C. or below. As for the lower limit, the temperature $T_C$ may be 60° C. or above.

The temperatures $T_A$, $T_B$, and $T_C$ can be determined as follows.

The pressure-responsive particles are pelletized by compression. The resulting sample pellets are set into a flow tester (CFT-500, Shimadzu), and viscosity versus temperature at 1 MPa is measured under a constant applied pressure of 1 MPa. On the resulting viscosity graph, the temperature $T_A$, at which the viscosity is $10^4$ Pa·s under an applied pressure of 1 MPa, is determined. The temperature $T_B$ is determined in the same way as the temperature $T_A$, except that the applied pressure, 1 MPa, is changed to 10 MPa. The temperature $T_C$ is also determined in the same way as the temperature $T_A$, except that the applied pressure, 1 MPa, is changed to 4 MPa. The temperature difference ($T_A$−$T_B$) is calculated from the temperatures $T_A$ and $T_B$, and the temperature difference ($T_A$−$T_C$) is calculated from the temperatures $T_A$ and $T_C$.

A specific example of pressure-responsive particles that may be used is ones containing baroplastics.

One possible form of baroplastics is a mixture of at least two resins with different glass transition temperatures (Tg), and another is a resin having at least two moieties with different glass transition temperatures in its molecule. Examples of such forms of baroplastics include the resins described in paragraphs 0039 to 0111 of Japanese Unexamined Patent Application Publication No. 2018-2889.

Pressure-responsive particles containing any of these two forms of baroplastics can be produced by emulsion aggregation or by dissolution and suspension, for instance. A specific example of a production process is that described in paragraphs 0128 to 0141 of Japanese Unexamined Patent Application Publication No. 2018-2889.

Specifically, pressure-responsive particles may contain a styrene resin polymerized from monomers including styrene and other vinyl monomer(s) and a (meth)acrylate resin polymerized from monomers including at least two (meth)

acrylates. The particles may have at least two glass transition temperatures with a 30° C. or greater difference between the lowest and the highest.

When containing a "styrene resin polymerized from monomers including styrene and other vinyl monomer(s)" and a "(meth)acrylate resin polymerized from monomers including at least two (meth)acrylates," pressure-responsive particles are prone to pressure-induced phase transition.

The following describes a possible form of pressure-responsive particles in detail.

In the following, the term "pressure-responsive particles" refers to "pressure-responsive particles that contain a styrene resin polymerized from monomers including styrene and other vinyl monomer(s) and a (meth)acrylate resin polymerized from monomers including at least two (meth)acrylates and have at least two glass transition temperatures with a 30° C. or greater difference between the lowest and the highest" unless stated otherwise. In the following, furthermore, the term "styrene resin" refers to a "styrene resin polymerized from monomers including styrene and other vinyl monomer(s)" unless stated otherwise, and "(meth) acrylate resin" refers to a "(meth)acrylate resin polymerized from monomers including at least two (meth)acrylates" unless stated otherwise.

As mentioned, pressure-responsive particles may contain at least a styrene resin and a (meth)acrylate resin. Pressure-responsive particles may contain a colorant, a release agent, and/or other additives.

Pressure-responsive particles may have a higher styrene resin content than a (meth)acrylate resin content. The styrene resin content may be 55% by mass or more and 80% by mass or less, preferably 60% by mass or more and 75% by mass or less, more preferably 65% by mass or more and 70% by mass or less of the total amount of the styrene and (meth)acrylate resins.

Styrene Resin

Pressure-responsive particles may contain a styrene resin polymerized from monomers including styrene and other vinyl monomer(s).

The percentage by mass of styrene to all constituent monomers for the styrene resin may be 60% by mass or more so that the pressure-responsive particles may be prevented from becoming fluidized without pressure. Preferably, this percentage is 70% by mass or more, more preferably 75% by mass or more. In order that the resulting pressure-responsive particles may be prone to pressure-induced phase transition, this percentage may be 95% by mass or less, preferably 90% by mass or less, more preferably 85% by mass or less.

For the same reasons, the percentage of styrene to all constituent monomers for the styrene resin may be 60% by mass or more and 95% by mass or less.

Examples of vinyl monomers other than styrene that can be constituents of the styrene resin include styrene monomers, excluding styrene, and acrylic monomers.

Examples of styrene monomers other than styrene include vinylnaphthalene; alkylstyrenes, such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; arylstyrenes, such as p-phenylstyrene; alkoxystyrenes, such as p-methoxystyrene; halostyrenes, such as p-chlorostyrene, 3,4-dichlorostyrene, p-fluorostyrene, and 2,5-difluorostyrene; and nitrostyrenes, such as m-nitrostyrene, o-nitrostyrene, and p-nitrostyrene. One styrene monomer may be used alone, or two or more may be used in combination.

As for acrylic monomers, at least one selected from the group consisting of (meth)acrylic acid and (meth)acrylates may be used. Examples of (meth)acrylates include alkyl (meth)acrylates, carboxyalkyl (meth)acrylates, hydroxyalkyl (meth)acrylates, alkoxyalkyl (meth)acrylates, and di(meth)acrylates. One acrylic monomer may be used alone, or two or more may be used in combination.

Examples of alkyl (meth)acrylates include methyl (meth) acrylate, ethyl (meth)acrylate, propyl (meth)acrylate, isopropyl (meth)acrylate, n-butyl (meth)acrylate, isobutyl (meth) acrylate, n-hexyl (meth) acrylate, 2-ethylhexyl (meth)acrylate, lauryl (meth)acrylate, stearyl (meth) acrylate, cyclohexyl (meth) acrylate, dicyclopentanyl (meth) acrylate, and isobornyl (meth)acrylate.

Examples of carboxyalkyl (meth)acrylates include 2-carboxyethyl (meth) acrylate.

Examples of hydroxyalkyl (meth)acrylates include 2-hydroxyethyl (meth) acrylate, 2-hydroxypropyl (meth) acrylate, 3-hydroxypropyl (meth) acrylate, 2-hydroxybutyl (meth)acrylate, 3-hydroxybutyl (meth)acrylate, and 4-hydroxybutyl (meth) acrylate.

Examples of alkoxyalkyl (meth)acrylates include 2-methoxyethyl (meth) acrylate.

Examples of di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

(Meth)acrylates like 2-(diethylamino)ethyl (meth)acrylate, benzyl (meth)acrylate, and methoxypolyethylene glycol (meth)acrylate are also examples of (meth)acrylates that can be used.

Besides styrene monomers and acrylic monomers, the following are also examples of vinyl monomers that can be constituents of the styrene resin: (meth)acrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as isoprene, butene, and butadiene.

The constituent monomers for the styrene resin may include (meth)acrylate(s) so that the resulting pressure-responsive particles may be prone to pressure-induced phase transition. Preferably, the monomers include alkyl (meth) acrylate(s), more preferably alkyl (meth)acrylate(s) having a C2 to C10 alkyl group, even more preferably alkyl (meth) acrylate(s) having a C4 to C8 alkyl group, in particular at least one of n-butyl acrylate or 2-ethylhexyl acrylate. The constituent monomers for the styrene resin and those for the (meth)acrylate resin may include the same (meth)acrylates so that the resulting pressure-responsive particles may be prone to pressure-induced phase transition.

The percentage by mass of (meth)acrylates to all constituent monomers for the styrene resin may be 40% by mass or less so that the pressure-responsive particles may be prevented from becoming fluidized without pressure. Preferably, this percentage is 30% by mass or less, more preferably 25% by mass or less. In order that the resulting pressure-responsive particles may be prone to pressure-induced phase transition, this percentage may be 5% by mass or more, preferably 10% by mass or more, more preferably 15% by mass or more. The (meth)acrylate(s) in this context may be alkyl (meth)acrylate(s), preferably alkyl (meth)acrylate(s) having a C2 to C10 alkyl group, more preferably alkyl (meth)acrylate(s) having a C4 to C8 alkyl group.

The constituent monomers for the styrene resin may include at least one of n-butyl acrylate or 2-ethylhexyl acrylate in particular. The total percentage of n-butyl acrylate and 2-ethylhexyl acrylate to all constituent monomers for the styrene resin may be 40% by mass or less so that the pressure-responsive particles may be prevented from becoming fluidized without pressure. Preferably, this percentage is 30% by mass or less, more preferably 25% by mass or less. In order that the resulting pressure-responsive particles may be prone to pressure-induced phase transition, this percentage may be 5% by mass or more, preferably 10% by mass or more, more preferably 15% by mass or more.

The weight-average molecular weight of the styrene resin may be 3,000 or more so that the pressure-responsive particles may be prevented from becoming fluidized without pressure. Preferably, this molecular weight is 4,000 or more, more preferably 5,000 or more. In order that the resulting pressure-responsive particles may be prone to pressure-induced phase transition, this molecular weight is 60,000 or less, preferably 55,000 or less, more preferably 50,000 or less.

As mentioned herein, the weight-average molecular weight (also written as "Mw") of a resin is that measured by gel permeation chromatography (GPC). The measurement of the molecular weight by GPC uses Tosoh's HLC-8120 GPC chromatograph with Tosoh's TSKgel SuperHM-M column (15 cm) and tetrahydrofuran eluate. A molecular-weight calibration curve constructed using monodisperse polystyrene standards is used to calculate the weight-average molecular weight of the resin.

The glass transition temperature of the styrene resin may be 30° C. or above so that the pressure-responsive particles may be prevented from becoming fluidized without pressure. Preferably, this glass transition temperature is 40° C. or above, more preferably 50° C. or above. In order that the resulting pressure-responsive particles may be prone to pressure-induced phase transition, this glass transition temperature may be 110° C. or below, preferably 100° C. or below, more preferably 90° C. or below.

As mentioned herein, the glass transition temperature of a resin is that determined from the DSC curve of the resin, which is measured by differential scanning calorimetry (DSC). More specifically, the glass transition temperature is the "extrapolated initial temperature of glass transition" as in the methods for determining glass transition temperatures set forth in JIS K7121:1987 "Testing Methods for Transition Temperatures of Plastics."

The glass transition temperature of a resin can be controlled by the kinds and proportions of the constituent monomers. The glass transition temperature tends to be lower with increasing density of flexible backbone units, such as methylene, ethylene, and oxyethylene groups, and higher with increasing density of rigid backbone units, such as aromatic and cyclohexane rings. The glass transition temperature, furthermore, tends to be lower with increasing density of pendant aliphatic groups.

The percentage by mass of the styrene resin in the pressure-responsive particles as a whole may be 55% by mass or more so that the pressure-responsive particles may be prevented from becoming fluidized without pressure. Preferably, this percentage is 60% by mass or more, more preferably 65% by mass or more. In order that the resulting pressure-responsive particles may be prone to pressure-induced phase transition, this percentage may be 80% by mass or less, preferably 75% by mass or less, even more preferably 70% by mass or less.

(Meth)acrylate Resin

Pressure-responsive particles may contain a (meth)acrylate resin polymerized from monomers including at least two (meth)acrylates.

The percentage by mass of (meth)acrylates to all constituent monomers for the (meth)acrylate resin may be 90% by mass or more, preferably 95% by mass or more, more preferably 98% by mass or more, in particular 100% by mass.

Examples of (meth)acrylates include alkyl (meth)acrylates, carboxyalkyl (meth)acrylates, hydroxyalkyl (meth) acrylates, alkoxyalkyl (meth)acrylates, and di(meth)acrylates.

Examples of alkyl (meth)acrylates include methyl (meth) acrylate, ethyl (meth)acrylate, propyl (meth)acrylate, isopropyl (meth)acrylate, n-butyl (meth)acrylate, isobutyl (meth) acrylate, n-hexyl (meth) acrylate, 2-ethylhexyl (meth)acrylate, lauryl (meth)acrylate, stearyl (meth) acrylate, cyclohexyl (meth) acrylate, dicyclopentanyl (meth) acrylate, and isobornyl (meth)acrylate.

Examples of carboxyalkyl (meth)acrylates include 2-carboxyethyl (meth) acrylate.

Examples of hydroxyalkyl (meth)acrylates include 2-hydroxyethyl (meth) acrylate, 2-hydroxypropyl (meth) acrylate, 3-hydroxypropyl (meth) acrylate, 2-hydroxybutyl (meth)acrylate, 3-hydroxybutyl (meth)acrylate, and 4-hydroxybutyl (meth) acrylate.

Examples of alkoxyalkyl (meth)acrylates include 2-methoxyethyl (meth) acrylate.

Examples of di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

(Meth)acrylates like 2-(diethylamino)ethyl (meth)acrylate, benzyl (meth)acrylate, and methoxypolyethylene glycol (meth)acrylate are also examples of (meth)acrylates that may be used.

One (meth)acrylate may be used alone, or two or more may be used in combination.

The (meth)acrylates may be alkyl (meth)acrylates as this may help obtain pressure-responsive particles prone to pressure-induced phase transition. Preferably, the (meth)acrylates are alkyl (meth)acrylates having a C2 to C10 alkyl group, more preferably alkyl (meth)acrylates having a C4 to C8 alkyl group, in particular n-butyl acrylate and 2-ethylhexyl acrylate. The constituent monomers for the styrene resin and those for the (meth)acrylate resin may include the same (meth)acrylates so that the resulting pressure-responsive particles may be prone to pressure-induced phase transition.

The percentage by mass of alkyl (meth)acrylates to all constituent monomers for the (meth)acrylate resin may be 90% by mass or more as this may help obtain pressure-responsive particles prone to pressure-induced phase transition. Preferably, this percentage is 95% by mass or more, more preferably 98% by mass or more, in particular 100% by mass. The alkyl (meth)acrylate(s) in this context may be alkyl (meth)acrylate(s) having a C2 to C10 alkyl group, preferably alkyl (meth)acrylate(s) having a C4 to C8 alkyl group.

Between the most abundant two, in terms of percentage by mass, of the at least two (meth)acrylates included in the constituent monomers for the (meth)acrylate resin, the ratio by mass may be between 80:20 and 20:80 as this may help obtain pressure-responsive particles prone to pressure-induced phase transition. Preferably, this ratio by mass is between 70:30 and 30:70, more preferably between 60:40 and 40:60.

The most abundant two, in terms of percentage by mass, of the at least two (meth)acrylates included in the constituent monomers for the (meth)acrylate resin may be alkyl (meth) acrylates. The alkyl (meth)acrylates in this context may be alkyl (meth)acrylates having a C2 to C10 alkyl group, preferably alkyl (meth)acrylates having a C4 to C8 alkyl group.

If the most abundant two, in terms of percentage by mass, of the at least two (meth)acrylates included in the constituent monomers for the (meth)acrylate resin are alkyl (meth) acrylates, the difference in the number of carbon atoms in the alkyl group therebetween may be one or more and four or less as this may help obtain pressure-responsive particles prone to pressure-induced phase transition. Preferably, this difference is two or more and four or less, more preferably three or four.

The constituent monomers for the (meth)acrylate resin may include n-butyl acrylate and 2-ethylhexyl acrylate as this may help obtain pressure-responsive particles prone to pressure-induced phase transition. Preferably, the most abundant two, in terms of percentage by mass, of the at least two (meth)acrylates included in the constituent monomers for the (meth)acrylate resin are n-butyl acrylate and 2-ethylhexyl acrylate. The total percentage of n-butyl acrylate and 2-ethylhexyl acrylate to all constituent monomers for the (meth)acrylate resin may be 90% by mass or more, preferably 95% by mass or more, more preferably 98% by mass or more, in particular 100% by mass.

The constituent monomers for the (meth)acrylate resin may include vinyl monomer(s) other than (meth)acrylates. Examples of vinyl monomers other than (meth)acrylates include (meth)acrylic acid; styrene; styrene monomers other than styrene; (meth)acrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as isoprene, butene, and butadiene. One such vinyl monomer may be used alone, or two or more may be used in combination.

If the constituent monomers for the (meth)acrylate resin may include vinyl monomer(s) other than (meth)acrylates, the vinyl monomer(s) other than (meth)acrylates may be at least one of acrylic acid or methacrylic acid, preferably acrylic acid.

The weight-average molecular weight of the (meth)acrylate resin may be 100,000 or more so that the pressure-responsive particles may be prevented from becoming fluidized without pressure. Preferably, this molecular weight is 120,000 or more, more preferably 150,000 or more. In order that the resulting pressure-responsive particles may be prone to pressure-induced phase transition, this molecular weight is 250,000 or less, preferably 220,000 or less, more preferably 200,000 or less.

The glass transition temperature of the (meth)acrylate resin may be 10° C. or below so that the resulting pressure-responsive particles may be prone to pressure-induced phase transition. Preferably, this glass transition temperature is 0° C. or below, more preferably −10° C. or below. In order that the pressure-responsive particles may be prevented from becoming fluidized without pressure, this glass transition temperature may be −90° C. or above, preferably −80° C. or above, more preferably −70° C. or above.

The percentage by mass of the (meth)acrylate resin in the pressure-responsive particles as a whole may be 20% by mass or more so that the resulting pressure-responsive particles may be prone to pressure-induced phase transition. Preferably, this percentage is 25% by mass or more, more preferably 30% by mass or more. In order that the pressure-responsive particles may be prevented from becoming fluidized without pressure, this percentage may be 45% by mass or less, preferably 40% by mass or less, even more preferably 35% by mass or less.

The total percentage of the styrene and (meth)acrylate resins in the pressure-responsive particles may be 70% by mass or more of the pressure-responsive particles as a whole. Preferably, this percentage is 80% by mass or more, more preferably 90% by mass or more, even more preferably 95% by mass or more, still more preferably 100% by mass.

Other Resins

Pressure-responsive particles may contain polystyrene; non-vinyl resins, such as epoxy, polyester, polyurethane, polyamide, cellulose, and polyether resins and modified rosin; and other resins. One such resin may be used alone, or two or more may be used in combination.

Additives

Pressure-responsive particles may optionally contain coloring agents (e.g., pigments and dyes), release agents (e.g., hydrocarbon waxes; natural waxes, such as carnauba, rice, and candelilla waxes; synthesized or mineral/petroleum waxes, such as montan wax; and ester waxes, such as fatty acid esters and montanates), charge control agents, and other additives.

Transparent pressure-responsive particles may contain 1.0% by mass or less coloring agent(s) as a percentage to the pressure-responsive particles as a whole. Lower coloring agent concentrations lead to higher transparency of the pressure-responsive particles.

Structure of Pressure-Responsive Particles

Pressure-responsive particles may have a sea-island structure, preferably possessing a sea phase containing a styrene resin and a dispersed island phase containing a (meth) acrylate resin. The specific form of the styrene resin, contained in the sea phase, is as described above, and that of the (meth)acrylate resin, contained in the island phase, is also as described above. There may be an island phase containing no (meth)acrylate resin dispersed in the sea phase.

In a sea-island structure of pressure-responsive particles, the average diameter of the islands may be 200 nm or more and 500 nm or less. An average diameter of islands of 500 nm or less may help the pressure-responsive particles undergo pressure-induced phase transition, and an average diameter of islands of 200 nm or more may lead to good mechanical strength (e.g., resistance to deformation during stirring in a developing unit) of the pressure-responsive particles. For these reasons, the average diameter of the islands may be 220 nm or more and 450 nm or less, preferably 250 nm or more and 400 nm or less.

Such an average diameter of islands in a sea-island structure can be achieved in, for example, the process for producing pressure-responsive particles described below. For instance, a greater or smaller amount of (meth)acrylate resin may be used with respect to a styrene resin, or, during the fusion and coalescence of aggregates of resin particles, the aggregates may be held at a high temperature for an extended or shortened period of time.

To check whether pressure-responsive particles have a sea-island structure and to measure the average diameter of the islands therein, the following method can be used.

A piece of epoxy resin with embedded pressure-responsive particles therein is sliced, for example using a diamond knife, and the slice is stained with osmium tetroxide or ruthenium tetroxide in a desiccator. The stained slice is observed using a scanning electron microscope (SEM). If there is a sea-island structure, the osmium tetroxide or ruthenium tetroxide stains the resins to different shades in the sea and islands; this can be used to check whether the particles have a sea-island structure. In the SEM image, furthermore, 100 randomly chosen islands are measured along their major axis. The mean of the 100 major axes is reported as the average diameter.

Pressure-responsive particles may be single-layer pressure-responsive base particles or may be core-shell pressure-responsive particles, having a core and a shell layer covering it. Core-shell pressure-responsive particles may be less likely to become fluidized without pressure.

In core-shell pressure-responsive particles, the core may contain styrene and (meth)acrylate resins because in that case the particles may be prone to pressure-induced phase transition. The shell layer may contain the styrene resin so that the pressure-responsive particles may be prevented from becoming fluidized without pressure. The specific form of the styrene resin is as described above, and that of the (meth)acrylate resin is also as described above.

In core-shell pressure-responsive particles, furthermore, the core may have a sea phase containing a styrene resin and a dispersed island phase containing a (meth)acrylate resin. The average diameter of the islands may be in any of the above ranges. When the core has such a structure, the shell layer may contain the styrene resin. In that case the sea phase of the core and the shell layer form a continuous structure that may help the pressure-responsive particles undergo pressure-induced phase transition. The specific form of the styrene resin, contained in the sea phase of the core and in the shell layer, is as described above, and that of the (meth)acrylate resin, contained in the island phase of the core, is also as described above.

The following are also examples of resins that can be contained in the shell layer: polystyrene; non-vinyl resins, such as epoxy, polyester, polyurethane, polyamide, cellulose, and polyether resins and modified rosin; and other resins. One such resin may be used alone, or two or more may be used in combination.

The average thickness of the shell layer may be 120 nm or more for reduced deformation of the pressure-responsive particles. Preferably, the average thickness of the shell layer is 130 nm or more, more preferably 140 nm or more. The average thickness of the shell layer, furthermore, may be 550 nm or less because in that case the pressure-responsive particles may be prone to pressure-induced phase transition. Preferably, the average thickness of the shell layer is 500 nm or less, more preferably 400 nm or less.

The average thickness of the shell layer can be measured as follows.

A piece of epoxy resin with embedded pressure-responsive particles therein is sliced, for example using a diamond knife, and the slice is stained with osmium tetroxide or ruthenium tetroxide in a desiccator. The stained slice is observed using a scanning electron microscope (SEM). Ten cross-sections of pressure-responsive particles are randomly selected from the SEM image, and the thickness of the shell layer is measured at 20 points and averaged for each of the particles. The mean of the averages over ten pressure-responsive particles is reported as the average thickness.

The volume-average diameter (D50v) of pressure-responsive particles may be 4 μm or more for easier handling of the particles. Preferably, the D50v is 5 μm or more, more preferably 6 μm or more. The D50v may be 12 μm or less because in that case the pressure-responsive particles as a whole may be prone to pressure-induced phase transition. Preferably, the D50v is 10 μm or less, more preferably 9 μm or less.

The volume-average diameter (D50v) of pressure-responsive particles is measured using Coulter Multisizer II (Beckman Coulter) with an aperture size of 100 μm. A dispersion of 0.5 mg or more and 50 mg or less of the pressure-responsive particles in 2 mL of a 5% by mass aqueous solution of a sodium alkylbenzene sulfonate is mixed with 100 mL or more and 150 mL or less of electrolyte (ISOTON-II, Beckman Coulter), and the mixture is sonicated for 1 minute. In the resulting sample liquid dispersion, the diameter of 50,000 particles having a diameter of 2 μm or more and 60 μm or less is measured. A size distribution by volume is plotted starting from the smallest diameter, and the diameter at which the cumulative volume is 50% is reported as the volume-average diameter (D50v) of the particles.

Characteristics of Pressure-Responsive Particles

Pressure-responsive particles have at least two glass transition temperatures, presumably with one being that of a styrene resin and another being that of a (meth)acrylate resin.

Pressure-responsive particles may have three or more glass transition temperatures, but preferably two. When pressure-responsive particles have two glass transition temperatures, styrene and (meth)acrylate resins may be the only resins in the particles, or the percentage of any resin that is not a styrene or (meth)acrylate resin may be small (e.g., 5% by mass or less of the pressure-responsive particles as a whole).

Pressure-responsive particles may have at least two glass transition temperatures with a 30° C. or greater difference between the lowest and the highest. The difference between the lowest and highest glass transition temperatures may be 40° C. or greater because in that case the pressure-responsive particles may be prone to pressure-induced phase transition. Preferably, the difference is 50° C. or greater, more preferably 60° C. or greater. As for the upper limit, the difference between the lowest and highest glass transition temperatures may be, for example, 140° C. or smaller, 130° C. or smaller, or 120° C. or smaller.

The lowest glass transition temperature exhibited by pressure-responsive particles may be 10° C. or below because in that case the particles may be prone to pressure-induced phase transition. Preferably, the lowest glass transition temperature is 0° C. or below, more preferably −10° C. or below. In order that the pressure-responsive particles may be prevented from becoming fluidized without pressure, the lowest glass transition temperature may be −90° C. or above, preferably −80° C. or above, more preferably −70° C. or above.

The highest glass transition temperature exhibited by pressure-responsive particles may be 30° C. or above so that the particles may be prevented from becoming fluidized without pressure. Preferably, the highest glass transition temperature is 40° C. or above, more preferably 50° C. or above. The highest glass transition temperature may be 70° C. or below because in that case the pressure-responsive particles may be prone to pressure-induced phase transition. Preferably, the highest glass transition temperature is 65° C. or below, more preferably 60° C. or below.

As mentioned herein, the glass transition temperatures of pressure-responsive particles are those determined from the DSC curve of the particles, which is measured by differential scanning calorimetry (DSC). More specifically, each glass transition temperature is the "extrapolated initial temperature of glass transition" as in the methods for determining glass transition temperatures set forth in JIS K7121:1987 "Testing Methods for Transition Temperatures of Plastics."

Production of Pressure-Responsive Particles

Pressure-responsive particles may be produced either by a dry process (e.g., kneading and milling) or by a wet process (e.g., aggregation and coalescence, suspension polymerization, or dissolution and suspension). Any known dry or wet process may be used. Aggregation and coalescent, in particular, may be used to produce pressure-responsive particles.

If aggregation and coalescence is used, the production of the pressure-responsive particles may include, for example:

- preparing a liquid dispersion of styrene resin particles, i.e., a liquid dispersion in which styrene resin particles, containing a styrene resin, are dispersed (preparation of a liquid dispersion of styrene resin particles);
- forming composite resin particles, containing styrene and (meth)acrylate resins, by polymerizing monomers into a (meth)acrylate resin in the liquid dispersion of styrene resin particles (formation of composite resin particles);
- forming aggregates by causing the composite resin particles to aggregate in the liquid dispersion of composite resin particles, i.e., the liquid dispersion in which the composite resin particles are dispersed (formation of aggregates); and
- forming pressure-responsive base particles by heating the liquid dispersion of aggregates, i.e., the liquid dispersion in which the aggregates are dispersed, and thereby making the aggregates fuse and coalesce together (fusion and coalescence).

The following describes this process in detail.

It should be noted that the following describes the production of pressure-responsive particles containing no coloring agent and no release agent. Optionally, however, coloring agent(s), release agent(s), and/or other additives may be used. If coloring agent(s) and release agent(s) are added to the pressure-responsive particles, the liquid dispersion of composite resin particles is mixed with that of coloring agent particles and that of release agent particles before the fusion and coalescence. The liquid dispersion of coloring agent particles and that of release agent particles can be produced by, for example, mixing materials together and dispersing them using a known dispersing machine.

Preparation of a Liquid Dispersion of Styrene Resin Particles

The liquid dispersion of styrene resin particles is a liquid dispersion in which styrene resin particles are dispersed in a dispersion medium, for example with the help of a surfactant.

Examples of dispersion media include aqueous ones, such as water and alcohols. One such dispersion medium may be used alone, or two or more may be used in combination.

Examples of surfactants include anionic surfactants, such as sulfates, sulfonates, phosphates, and soap surfactants; cationic surfactants, such as amine salts and quaternary ammonium salts; and nonionic surfactants, such as polyethylene glycol surfactants, ethylene oxide adducts of alkylphenols, and polyhydric alcohols. Nonionic surfactants may be used in combination with anionic or cationic surfactants. Anionic surfactants are typical examples in particular. One surfactant may be used alone, or two or more may be used in combination.

The dispersion of styrene resin particles in a dispersion medium can be achieved by, for example, mixing the styrene resin and the dispersion medium together and then stirring the mixture with a rotary-shear homogenizer or a ball mill, sand mill, Dyno-Mill, or other medium mill.

Alternatively, emulsion polymerization may be used to disperse the styrene resin particles in the dispersion medium. Specifically, mixing the starting monomers for the styrene resin with a chain transfer agent or polymerization initiator, adding an aqueous medium containing a surfactant, stirring the mixture to give an emulsion, and then polymerizing the monomers in the emulsion will give a liquid dispersion of particles of the styrene resin. The chain transfer agent may be dodecanethiol.

The volume-average diameter of the styrene resin particles dispersed in the liquid dispersion may be 100 nm or more and 250 nm or less, preferably 120 nm or more and 220 nm or less, more preferably 150 nm or more and 200 nm or less.

The volume-average diameter of resin particles in a liquid dispersion in this context is that determined by measuring the diameters of the particles using a laser-diffraction particle size distribution analyzer (e.g., HORIBA LA-700). In a size distribution by volume plotted starting from the smallest diameter, the diameter at which the cumulative volume is 50% is the volume-average diameter (D50v) of the particles.

The amount of the styrene resin particles in the liquid dispersion may be 30% by mass or more and 60% by mass or less, preferably 40% by mass or more and 50% by mass or less.

Formation of Composite Resin Particles

The liquid dispersion of styrene resin particles is mixed with starting monomers for a (meth)acrylate resin, and the monomers are polymerized in the liquid dispersion to give particles containing styrene and (meth)acrylate resins, or composite resin particles.

In the resulting composite resin particles, the styrene and (meth)acrylate resins may be in microphase separation. An example of how to produce such resin particles is as follows.

The liquid dispersion of styrene resin particles is combined with starting monomers for the (meth)acrylate resin (monomers including at least two (meth)acrylates), optionally with an aqueous medium. The liquid dispersion is stirred gently and, at the same time, is heated to a temperature equal to or higher than the glass transition temperature of the styrene resin (e.g., the glass transition temperature of the styrene resin plus 10° C. to 30° C.). With the dispersion held at that temperature, an aqueous medium containing a polymerization initiator is slowly added dropwise, and stirring is continued for an extended period of time between 1 and 15 hours. The polymerization initiator may be ammonium persulfate.

Although the exact mechanism is unclear, the inventors presume that in the above method, the styrene resin particles are impregnated with the monomers and the polymerization initiator, causing the (meth)acrylates to polymerize inside the particles. As a result, the inventors believe, the styrene resin particles hold the (meth)acrylate resin inside them, and in the resulting composite resin particles the styrene and (meth)acrylate resins form microphase separation.

The volume-average diameter of the composite resin particles dispersed in the liquid dispersion may be 140 nm or more and 300 nm or less, preferably 150 nm or more and 280 nm or less, more preferably 160 nm or more and 250 nm or less.

The amount of the composite resin particles in the liquid dispersion may be 20% by mass or more and 50% by mass or less, preferably 30% by mass or more and 40% by mass or less.

Formation of Aggregates

In the liquid dispersion of composite resin particles, the composite resin particles are caused to aggregate. Through this, the particles form aggregates having a diameter close to that of the finished pressure-responsive particles.

Specifically, for example, a flocculant is added to the liquid dispersion of composite resin particles, and the liquid dispersion is adjusted to an acidic pH (e.g., 2 or more and 5 or less) at the same time. Optionally, a dispersion stabilizer may be added. Then the liquid dispersion is heated to a temperature close to the glass transition temperature of the styrene resin (specifically, for example, a temperature higher than or equal to the glass transition temperature of the styrene resin minus 30° C. but not higher than the glass transition temperature of the resin particles minus 10° C.), causing the composite resin particles to aggregate.

In the formation of aggregates, the flocculant may be added at room temperature (e.g., 25° C.) while the liquid dispersion of composite resin particles is stirred using a rotary-shear homogenizer. Then the liquid dispersion is adjusted to an acidic pH (e.g., 2 or more and 5 or less) and heated, optionally with a dispersion stabilizer.

Examples of flocculants include surfactants having the opposite polarity with respect to the surfactant(s) in the liquid dispersion, inorganic metal salts, and divalent or higher-valency metal complexes. Using a metal complex as a flocculant may help improve charging characteristics as it will reduce the surfactant content.

Optionally, an additive that forms a complex or otherwise binds with metal ions from the flocculant may be used. An example is a chelating agent.

Examples of inorganic metal salts include metal salts like calcium chloride, calcium nitrate, barium chloride, magnesium chloride, zinc chloride, aluminum chloride, and aluminum sulfate; and polymers of inorganic metal salts, such as polyaluminum chloride, polyaluminum hydroxide, and calcium polysulfide.

The chelating agent, if used, may be a water-soluble one. Examples of chelating agents include oxycarboxylic acids, such as tartaric acid, citric acid, and gluconic acid; and aminocarboxylic acids, such as iminodiacetic acid (IDA), nitrilotriacetic acid (NTA), and ethylenediaminetetraacetic acid (EDTA).

The amount of the chelating agent may be 0.01 parts by mass or more and 5.0 parts by mass or less, preferably 0.1 parts by mass or more and less than 3.0 parts by mass, per 100 parts by mass of the resin particles.

Fusion and Coalescence

Then the liquid dispersion in which the aggregates are dispersed, or the liquid dispersion of aggregates, is heated to a temperature equal to or higher than the glass transition temperature of the styrene resin (e.g., the glass transition temperature of the styrene resin plus 10° C. to 30° C.), causing the aggregates to fuse and coalesce. Through this, the aggregates form pressure-responsive particles.

Pressure-responsive particles obtained in such a way usually have a sea-island structure possessing a sea phase containing a styrene resin and a dispersed island phase containing a (meth)acrylate resin. In the composite resin particles the styrene and (meth)acrylate resins are in micro-phase separation, but during the fusion and coalescence, the inventors believe, styrene resin portions gather to form the sea phase, and (meth)acrylate resin portions gather to form the island phase.

The average diameter of islands in the sea-island structure can be controlled by, for example, using a greater or smaller volume of the liquid dispersion of styrene resin particles or greater or smaller amounts of the at least two (meth) acrylates in forming the composite resin particles or by keeping the aggregates at a high temperature for an extended or shortened period of time during the fusion and coalescence.

Core-Shell Pressure-Responsive Particles are Produced Through, for Example:

- the formation of second aggregates after the preparation of the liquid dispersion of aggregates, in which the liquid dispersion of aggregates is mixed with an extra volume of the liquid dispersion of styrene resin particles, and the styrene resin particles therein are caused to aggregate in such a manner that they will adhere to the surface of the aggregates; and
- the formation of core-shell pressure-responsive particles, in which the liquid dispersion of second aggregates, in which the second aggregates are dispersed, is heated to make the second aggregates fuse and coalesce.

Core-shell pressure-responsive particles obtained in such a way have a shell layer containing a styrene resin. The liquid dispersion of styrene resin particles may be replaced with that of particles of a different resin so that a shell layer containing that resin will be formed.

After the end of fusion and coalescence, the pressure-responsive particles, formed in a solution, are washed, separated from the solution, and dried to give pressure-responsive particles in a dry state.

The washing can be by known methods. For example, the solvent may be replaced with deionized water.

The separation from the solution, too, can be by known methods, but suction filtration, pressure filtration, etc., may be used for productivity reasons.

The drying can be that in the method according to an exemplary embodiment of the present disclosure for producing resin particles or with the use of the dryer according to an exemplary embodiment of the present disclosure, both described above. By virtue of reduced formation of coarse particles, the resulting dry pressure-responsive particles may contain few coarse particles.

To the dry pressure-responsive particles obtained in such a way, external additives may be added.

For example, the external additives may be added by mixing them into the resulting pressure-responsive particles in a dry state. The mixing may be done using, for example, a V-blender, Henschel mixer, or Lödige mixer. Optionally, coarse particles may be removed, for example using a vibrating sieve or air-jet sieve.

External Additives

An example of an external additive to pressure-responsive particles is inorganic particles. Examples of inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO·SiO_2$, $K_2O·(TiO_2)_n$, $Al_2O_3·2SiO_2$, $CaCO_3$, $MgCO_3$, $BaSO_4$, and $MgSO_4$.

The surface of the externally added inorganic particles may have been rendered hydrophobic.

Materials like resin particles (particles of polystyrene, polymethyl methacrylate, melamine resins, etc.) and active cleaning agents (e.g., metal salts of higher fatty acids, typically zinc stearate, and particles of fluoropolymers) are also examples of external additives that can be used.

The total amount of external additives may be 1.0 part by mass or more and 20.0 parts by mass or less, preferably 1.0 part by mass or more and 10.0 parts by mass or less, more preferably 2.5 parts by mass or more and 7.0 parts by mass or less per 100 parts by mass of the pressure-responsive particles.

EXAMPLES

The following describes exemplary embodiments of the present disclosure in detail by providing examples, although the scope in which aspects of the present disclosure can be embodied is not limited to these examples. In the following description, "parts" and "%" are by mass unless stated otherwise.

Preparation of Pressure-Responsive Particles

Pressure-responsive particles are prepared as follows.

Production of Resin Particles (A)

Liquid Dispersion (1) of Resin Particles: Preparation of a High-Tg Resin

The following ingredients are mixed to give monomer solution (1).

Styrene: 450 parts by mass
n-butyl acrylate: 150 parts by mass
Acrylic acid: 12 parts by mass
Dodecanethiol: 9 parts by mass Monomer solution (1) is added to a separately prepared solution of 20 parts of an anionic surfactant (DOWFAX 2A1, Dow Chemical) in 250 parts of deionized water, and the monomers are dispersed in the flask to give an emulsion (monomer emulsion A).

A similar surfactant solution, 3 parts of an anionic surfactant (DOWFAX 2A1, Dow Chemical) in 555 parts of deionized water, is loaded into a polymerization flask.

After being tightly sealed and a reflux tube is attached thereto, the polymerization flask is heated to 75° C. in a water bath while nitrogen is introduced with gentle stirring, and then held at that temperature.

To this polymerization flask, a solution of 9 parts by mass of ammonium persulfate in 43 parts by mass of deionized water is added dropwise over 20 minutes via a metering pump. Then monomer emulsion A is added dropwise over 200 minutes via a metering pump.

While gentle stirring is continued, the polymerization flask is kept at 75° C. for 3 hours to finish the polymerization process.

This gives a liquid dispersion of resin particles in which the median diameter of particles is 75 nm, the glass transition temperature and the weight-average molecular weight of the resin are 51° C. and 29,000, respectively, and the solids content is 42% by mass (liquid dispersion (1)).

Liquid Dispersion (2) of Resin Particles: Preparation of a Low-Tg Resin

The following ingredients are mixed to give monomer solution (2).

Styrene: 100 parts by mass
n-butyl acrylate: 500 parts by mass
Acrylic acid: 12 parts by mass
Dodecanethiol: 9 parts by mass Monomer solution (2) is added to a separately prepared solution of 20 parts of an anionic surfactant (DOWFAX 2A1, Dow Chemical) in 250 parts of deionized water, and the monomers are dispersed in the flask to give an emulsion (monomer emulsion B).

A similar surfactant solution, 3 parts of an anionic surfactant (DOWFAX 2A1, Dow Chemical) in 555 parts of deionized water, is loaded into a polymerization flask.

After being tightly sealed and a reflux tube is attached thereto, the polymerization flask is heated to 75° C. in a water bath while nitrogen is introduced with gentle stirring, and then held at that temperature.

To this polymerization flask, a solution of 9 parts by mass of ammonium persulfate in 43 parts by mass of deionized water is added dropwise over 20 minutes via a metering pump. Then monomer emulsion B is added dropwise over 200 minutes via a metering pump. While gentle stirring is continued, the polymerization flask is kept at 75° C. for 3 hours to finish the polymerization process.

This gives a liquid dispersion of resin particles in which the median diameter of particles is 50 nm, the glass transition temperature and the weight-average molecular weight of the resin are 10° C. and 26,000, respectively, and the solids content is 42% by mass (liquid dispersion (2)).

Preparation of Resin Particles (A) in a Wet State

Ingredients are mixed and dispersed in a stainless-steel round-bottom flask using a homogenizer (ULTRA-TURRAX T50, IKA) according to the formula below. The flask is heated to 42° C. in an oil bath for heating while being stirred, held at 42° C. for 60 minutes, and then stirred gently with another 100 parts by mass of liquid dispersion (1) of resin particles (21 parts by mass as resin).

Liquid dispersion (1) of resin particles: 100 parts by mass (21 parts by mass as resin)
Liquid dispersion (2) of resin particles: 100 parts by mass (42 parts by mass as resin)
Polyaluminum chloride: 0.15 parts by mass
Deionized water: 300 parts by mass After the pH of the system is adjusted to 5.5 with a 0.5 moles/liter aqueous solution of sodium hydroxide, the mixture is heated to 90° C. with continued stirring. This usually causes the pH of the system to decrease to 4.5 or below before the temperature reaches 95° C., but in this process, the pH is kept higher than 5.0 by adding a further amount of the aqueous solution of sodium hydroxide dropwise.

After the end of the reaction, the mixture is cooled and filtered. The residue is washed with deionized water and then separated into solid and liquid fractions by Nutsche filtration. The solid fraction is dispersed again in deionized water at 40° C. and washed for 15 minutes by stirring at 100 rpm with a stainless-steel impeller. After three repetitions of this washing operation, the dispersion is separated into solid and liquid fractions by Nutsche filtration, and then the water content of the solid fraction is adjusted to 40% by mass. The solid fraction is pulverized using a sieving mill (comil) thereafter, giving resin particles in a wet state (resin particles (A)).

Resin particles (A) are pressure-responsive particles.

Production of Resin Particles (B)

Preparation of a Liquid Dispersion Containing Styrene Resin Particles

Preparation of Liquid Dispersion (St1) of Styrene Resin Particles

Styrene: 390 parts
n-butyl acrylate: 100 parts
Acrylic acid: 10 parts
Dodecanethiol: 7.5 parts These materials are mixed to give a monomer solution.

This monomer solution is added to a solution of 8 parts of an anionic surfactant (Dowfax 2A1, Dow Chemical) in 205 parts of deionized water, and the monomers are dispersed to give an emulsion.

A solution of 2.2 parts of an anionic surfactant (Dowfax 2A1, Dow Chemical) in 462 parts of deionized water is loaded into a polymerization flask equipped with a stirrer, a thermometer, a reflux condenser, and a nitrogen gas tube. The solution is heated to 73° C. while being stirred, and then held at that temperature.

To this polymerization flask, a solution of 3 parts of ammonium persulfate in 21 parts of deionized water is added dropwise over 15 minutes via a metering pump. Then the emulsion is added dropwise over 160 minutes via a metering pump.

While gentle stirring is continued, the polymerization flask is kept at 75° C. for 3 hours and returned to room temperature.

This gives a liquid dispersion of styrene resin particles, containing particles of a styrene resin, in which the volume-average diameter (D50v) of resin particles is 174 nm, the weight-average molecular weight in GPC (UV detection) and the glass transition temperature of the resin are 49000 and 54° C., respectively, and the solids content is 42% (liquid dispersion (St1)).

Preparation of a Liquid Dispersion Containing Composite Resin Particles

Preparation of Liquid Dispersion (M1) of Composite Resin Particles

Liquid dispersion (St1) of styrene resin particles: 1190 parts (500 parts as solids)
2-Ethylhexyl acrylate: 250 parts
n-butyl acrylate: 250 parts
Deionized water: 982 parts These materials are loaded into a polymerization flask, stirred for 1 hour at 25° C., and then heated to 70° C.

To this polymerization flask, a solution of 2.5 parts of ammonium persulfate in 75 parts of deionized water is added dropwise over 60 minutes via a metering pump.

While gentle stirring is continued, the polymerization flask is kept at 70° C. for 3 hours and returned to room temperature.

This gives a liquid dispersion of composite resin particles, containing particles of composite resins, in which the volume-average diameter (D50v) of resin particles is 219 nm, the weight-average molecular weight in GPC (UV detection) of the resin is 219000, and the solids content is 32% (liquid dispersion (M1)).

Production of Pressure-Responsive Particles

Liquid dispersion (M1) of composite resin particles: 504 parts
Deionized water: 710 parts
Anionic surfactant (Dowfax 2A1, Dow Chemical): 1 part These materials are put into a reactor equipped with a thermometer and a pH meter, and the pH is adjusted to 3.0 with a 1.0% aqueous solution of nitric acid at a temperature of 25° C. While the particles are dispersed at a rotational frequency of 5,000 rpm using a homogenizer (ULTRA-TURRAX T50, IKA), 23 parts of a 2.0% aqueous solution of aluminum sulfate is added. A stirrer and a heating mantle are attached to the reactor, and the temperature is increased to 40° C. at a rate of 0.2° C./min and beyond 40° C. at a rate of 0.05° C./min. The diameter of the particles is measured every 10 minutes using Multisizer II (aperture size, 50 μm; Beckman Coulter). When the volume-average diameter is 5.0 μm, 170 parts of liquid dispersion (St1) of styrene resin particles is added over 5 minutes with the temperature held constant. The resulting slurry is held at 50° C. for 30 minutes, and then the pH is adjusted to 6.0 with a 1.0% aqueous solution of sodium hydroxide. The temperature is increased to 90° C. at a rate of 1° C./min while the pH is adjusted to 6.0 every 5° C., and then held at 90° C. The morphology and surface characteristics of the particles are observed under an optical microscope and a field-emission scanning electron microscope (FE-SEM). At 10 hours, the particles are found to have coalesced, and the reactor is cooled with water to 30° C. over 5 minutes.

From the cooled slurry, coarse particles are removed by sieving through a 15-μm mesh nylon sieve, and the sieved slurry is filtered by vacuum filtration with an aspirator. The solid residue on the filter paper is crushed manually into as small particles as possible, and the resulting particles are stirred in a ten-fold volume of deionized water (temperature, 30° C.) for 30 minutes. The resulting dispersion is filtered by vacuum filtration with an aspirator, the solid residue on the filter paper is crushed manually into as small particles as possible, and the resulting particles are stirred in a ten-fold volume of deionized water (temperature, 30° C.) for 30 minutes. The resulting dispersion is filtered by vacuum filtration with an aspirator once again, and the electrical conductivity of the filtrate is measured. The solid residue is washed repeatedly by this operation until the electrical conductivity of the filtrate falls to 10 μS/cm or below.

After the water content is adjusted to 40% by mass, the washed solids are pulverized using a sieving mill (comil), giving resin particles in a wet state (resin particles (B)).

Resin particles (B) are pressure-responsive particles.

Example 1

Resin particles (A) in a wet state are applied to a dryer as illustrated in FIG. 1 and dried. The drying conditions are as in Table 1.

The volume-average diameter D50v and the geometric standard deviation by volume GSDv of dried resin particles (A) are 6.5 μm and 1.23, respectively.

The shape factor SF1 of resin particles (A) determined through shape observation with LUZEX is 130.

The temperature difference ($T_A-T_B$) for resin particles (A) is 35° C.

Examples 2 to 18

Resin particles (A) in a wet state are dried using a dryer as in Example 1, except that the drying conditions are changed as in Table 1 or 2.

Example 19

Instead of resin particles (A) in a wet state, resin particles (B) in a wet state are dried using a dryer as in Example 1.

The volume-average diameter D50v of dried resin particles (B) is 8.0 μm.

The temperature difference ($T_A-T_B$) for resin particles (B) is 40° C.

Measurement

The measurement of the drying conditions in Tables 1 and 2 is as described hereinabove. A summary of measured conditions is presented in Table 1 or 2.

Testing

Reduction of the Formation of Coarse Particles

The dried resin particles are sieved through a 20-μm mesh test sieve as specified in JIS Z 8801-1: 2006. The percentage by mass of particles that do not pass through the sieve (i.e., coarse particles) to the total amount of the dried resin particles is reported as coarse particles content [% by mass].

The reduction of the formation of coarse particles is graded according to the criteria below. The results are presented in Table 1 or 2.

G1: The coarse particles content is 0.1% by mass or less.

G2: The coarse particles content is more than 0.1% by mass and 0.5% by mass or less.

G3: The coarse particles content is more than 0.5% by mass and 1.0% by mass or less.

G4: The coarse particles content is more than 1.0% by mass and 1.5% by mass or less.

G5: The coarse particles content is more than 1.5% by mass.

Formation of Voids

Fifty parts of the dried resin particles are blended with 1.5 parts of hydrophobic silica (TS720, Cabot) using a sample mill to give a toner containing an external additive.

This toner is stirred and blended with a ferrite carrier in a ball mill for 5 minutes. The carrier particles have an average diameter of 35 μm and a coating of 1% by mass polymethyl methacrylate (Soken Chemical & Engineering Co., Ltd.), and the amount of the toner is such that the toner concentration will be 8% by mass. This gives an electrostatic charge image developer.

The resulting electrostatic charge image developer is set in the magenta position of a modified version of FUJIFILM Business Innovation Corp.'s DocuCentre C7550I image forming apparatus. A cyan toner developer commercially available from FUJIFILM Business Innovation Corp. is set in the cyan position of the same apparatus.

This image forming apparatus is operated to perform continuous printing on 1000 sheets of A4-sized paper under 30° C. and 85% RH conditions, producing a cyan solid image and coating it with a solid layer of the dried resin particles. The weight of toner per unit area is 1 $g/m^2$.

The 1000 printed sheets of paper are visually inspected for voids, and void formation is graded according to the criteria below. Any coarse particle present in the dried resin particles causes a void when the cyan solid image is transferred with the solid layer of dried resin particles therebeneath. In other words, therefore, fewer voids mean a smaller quantity of coarse particles in the dried resin particles. The results are presented in Table 1 or 2.

G1: No sheet has voids

G2: One or more and five or fewer sheets have voids

G3: Six or more and ten or fewer sheets have voids

G4: Eleven or more sheets have voids

TABLE 1

| | Resin particles | | | Drying unit | | | | | | | |
|---|---|---|---|---|---|---|---|---|---|---|---|
| | | | | | Velocity | | | | | | |
| | Type | $T_A - T_B$ [° C.] | Water content [% by mass] | Circulation [—] | Velocity V1 of the first gas [m/s] | V2 of the second gas blown out [m/s] | Δ (V2 − V1) [m/s] | Number of gas blowholes [blowhole(s)] | Flow rate Q1 of the first gas [$m^3$/min] | Flow rate Q2 of the second gas [$m^3$/min] | Q2/(Q1 + Q2) [—] |
| Example 1 | (A) | 35 | 40 | No | 1 | 150 | 149 | 3 | 0.12 | 2.1 | 0.95 |
| Example 2 | (A) | 35 | 40 | No | 0.8 | 60 | 59.2 | 3 | 0.1 | 0.9 | 0.90 |
| Example 3 | (A) | 35 | 40 | No | 1 | 100 | 99 | 3 | 0.12 | 1.4 | 0.92 |
| Example 4 | (A) | 35 | 40 | No | 0.6 | 150 | 149.4 | 1 | 0.07 | 0.7 | 0.91 |
| Example 5 | (A) | 35 | 40 | No | 0.3 | 150 | 149.7 | 3 | 0.03 | 2.1 | 0.99 |
| Example 6 | (A) | 35 | 40 | No | 2.5 | 150 | 147.5 | 3 | 0.3 | 2.1 | 0.88 |
| Example 7 | (A) | 35 | 40 | No | 2.8 | 150 | 147.2 | 3 | 0.12 | 2.1 | 0.95 |
| Example 8 | (A) | 35 | 40 | No | 1.6 | 150 | 148.4 | 3 | 0.12 | 2.1 | 0.95 |
| Example 9 | (A) | 35 | 40 | No | 1 | 150 | 149 | 2 | 0.12 | 1.4 | 0.92 |
| Example 10 | (A) | 35 | 40 | No | 0.4 | 150 | 149.6 | 3 | 0.05 | 0.5 | 0.91 |
| Example 11 | (A) | 35 | 40 | No | 1 | 90 | 89 | 5 | 0.12 | 2.1 | 0.95 |
| Example 12 | (A) | 35 | 40 | No | 1 | 150 | 149 | 3 | 0.12 | 2.1 | 0.95 |

| | Drying unit | | | | Collector | | | Testing | |
|---|---|---|---|---|---|---|---|---|---|
| | Maximum diameter D of the drying tube [m] | Maximum diameter d of the gas blowhole(s) [m] | d/D [—] | Temperature of the second gas [° C.] | Type [—] | Internal temperature [° C.] | Linear velocity of the gas passing through the filtration bags [m/s] | Coarse particles | Voids |
| Example 1 | 0.05 | 0.01 | 0.2 | 60 | Bag filter | 35 | 0.02 | G1 | G1 |
| Example 2 | 0.05 | 0.01 | 0.2 | 60 | Bag filter | 35 | 0.02 | G3 | G3 |
| Example 3 | 0.05 | 0.01 | 0.2 | 60 | Bag filter | 35 | 0.02 | G3 | G3 |
| Example 4 | 0.05 | 0.01 | 0.2 | 60 | Bag filter | 35 | 0.02 | G3 | G3 |
| Example 5 | 0.05 | 0.01 | 0.2 | 60 | Bag filter | 35 | 0.02 | G1 | G1 |
| Example 6 | 0.05 | 0.01 | 0.2 | 60 | Bag filter | 35 | 0.02 | G1 | G1 |
| Example 7 | 0.03 | 0.01 | 0.33 | 60 | Bag filter | 35 | 0.02 | G2 | G2 |
| Example 8 | 0.04 | 0.01 | 0.25 | 60 | Bag filter | 35 | 0.02 | G1 | G1 |
| Example 9 | 0.05 | 0.01 | 0.2 | 60 | Bag filter | 35 | 0.02 | G2 | G2 |
| Example 10 | 0.05 | 0.005 | 0.1 | 60 | Bag filter | 35 | 0.02 | G1 | G1 |
| Example 11 | 0.05 | 0.01 | 0.2 | 60 | Bag filter | 35 | 0.02 | G2 | G2 |
| Example 12 | 0.05 | 0.01 | 0.2 | 60 | Cyclone | 38 | — | G4 | G3 |

TABLE 2

| | Resin particles: Type | Resin particles: $T_A - T_B$ [° C.] | Resin particles: Water content [% by mass] | Drying unit: Circulation [—] | Drying unit: Velocity V1 of the first gas [m/s] | Drying unit: Velocity V2 of the second gas blown out [m/s] | Drying unit: Δ (V2 − V1) [m/s] | Drying unit: Number of gas blowholes [blowhole(s)] | Drying unit: Flow rate Q1 of the first gas [$m^3$/min] | Drying unit: Flow rate Q2 of the second gas [$m^3$/min] | Drying unit: Q2/(Q1 + Q2) [—] |
|---|---|---|---|---|---|---|---|---|---|---|---|
| Example 13 | (A) | 35 | 40 | No | 1 | 150 | 149 | 3 | 0.12 | 2.1 | 0.95 |
| Example 14 | (A) | 35 | 40 | No | 1 | 150 | 149 | 3 | 0.12 | 2.1 | 0.95 |
| Example 15 | (A) | 35 | 40 | No | 1 | 150 | 149 | 3 | 0.12 | 2.1 | 0.95 |
| Example 16 | (A) | 35 | 40 | No | 1 | 150 | 149 | 3 | 0.12 | 2.1 | 0.95 |
| Example 17 | (A) | 35 | 40 | No | 1 | 150 | 149 | 3 | 0.12 | 2.1 | 0.95 |
| Example 18 | (A) | 35 | 40 | No | 1 | 150 | 149 | 3 | 0.12 | 2.1 | 0.95 |
| Example 19 | (B) | 40 | 40 | No | 1 | 150 | 149 | 3 | 0.12 | 2.1 | 0.95 |
| Comparative Example 1 | (A) | 35 | 40 | Yes | 1 | 150 | 149 | 3 | 0.12 | 2.1 | 0.95 |
| Comparative Example 2 | (A) | 35 | 40 | No | 0.5 | 40 | 39.5 | 3 | 0.06 | 0.6 | 0.91 |

| | Drying unit: Maximum diameter D of the drying tube [m] | Drying unit: Maximum diameter d of the gas blowhole(s) [m] | Drying unit: d/D [—] | Drying unit: Temperature of the second gas [° C.] | Collector: Type [—] | Collector: Internal temperature [° C.] | Collector: Linear velocity of the gas passing through the filtration bags [m/s] | Testing: Coarse particles | Testing: Voids |
|---|---|---|---|---|---|---|---|---|---|
| Example 13 | 0.05 | 0.01 | 0.2 | 75 | Bag filter | 35 | 0.02 | G2 | G2 |
| Example 14 | 0.05 | 0.01 | 0.2 | 70 | Bag filter | 45 | 0.02 | G3 | G3 |
| Example 15 | 0.05 | 0.01 | 0.2 | 45 | Bag filter | 35 | 0.02 | G2 | G2 |
| Example 16 | 0.05 | 0.01 | 0.2 | 60 | Bag filter | 15 | 0.02 | G2 | G2 |
| Example 17 | 0.05 | 0.01 | 0.2 | 60 | Bag filter | 35 | 0.15 | G3 | G3 |
| Example 18 | 0.05 | 0.01 | 0.2 | 60 | Bag filter | 35 | 0.08 | G2 | G2 |
| Example 19 | 0.05 | 0.01 | 0.2 | 60 | Bag filter | 35 | 0.02 | G1 | G1 |
| Comparative Example 1 | 0.05 | 0.01 | 0.2 | 60 | Bag filter | 35 | 0.02 | G5 | G4 |
| Comparative Example 2 | 0.05 | 0.02 | 0.4 | 60 | Bag filter | 35 | 0.02 | G5 | G4 |

As is clear from Tables 1 and 2, the methods according to the Examples for producing resin particles may help reduce the formation of coarse particles compared with those according to the Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing resin particles, the method comprising:

drying resin particles in a wet state by passing, without circulating, the resin particles through a drying tube together with a first gas, the resin particles being ones that undergo pressure-induced phase transition, wherein:

the drying tube has an inlet through which the resin particles are fed into the drying tube, at least one gas blowhole through which a second gas is blown over the resin particles passing through the drying tube, and an outlet through which the resin particles are ejected from the drying tube; and the second gas is blown out of the gas blowhole at a velocity of 50 m/s or more.

2. A method for producing resin particles, the method comprising:

drying resin particles in a wet state by passing, without circulating, the resin particles through a drying tube together with a first gas, the resin particles being ones that undergo pressure-induced phase transition, wherein:

the drying tube has an inlet through which the resin particles are fed into the drying tube, at least one gas blowhole through which a second gas is blown over the resin particles passing through the drying tube, and an outlet through which the resin particles are ejected from the drying tube; and a difference Δ(V2−V1) is 40 m/s or more, where V1 is a velocity of the first gas passing through the drying tube, and V2 is a velocity of the second gas blown out of the gas blowhole.

3. The method according to claim 1 for producing resin particles, wherein the drying tube has two or more gas blowholes.

4. The method according to claim 3 for producing resin particles, wherein the second gas is blown at a velocity of 100 m/s or more out of each of the two or more gas blowholes.

5. The method according to claim 3 for producing resin particles, wherein Q2/(Q1+Q2)≥0.9, where Q1 is a flow rate of the first gas through the drying tube, and Q2 is a total flow rate of the second gas through the gas blowholes.

6. The method according to claim 1 for producing resin particles, wherein d/D≤0.25, where D is a maximum diameter of the drying tube, and d is a maximum diameter of the gas blowhole.

7. The method according to claim 6 for producing resin particles, wherein d/D≤0.20, where D is a maximum diameter of the drying tube, and d is a maximum diameter of the gas blowhole.

8. The method according to claim 1 for producing resin particles, the method further comprising collecting the resin particles ejected from the drying tube at a collector, wherein:

a temperature T1 of the second gas blown out of the gas blowhole is 50° C. or above and 70° C. or below, and a temperature T2 of the second gas in the collector is 20° C. or above or 40° C. or below.

9. The method according to claim 8 for producing resin particles, wherein the collector includes a bag filter, and a gas that passes through a filtration bag in the bag filter has a linear velocity of 0.1 m/s or less.

10. The method according to claim 1 for producing resin particles, wherein $$8°\text{ C.} \leq T_A - T_B \quad (1)$$

where $T_A$ is a temperature at which the resin particles exhibit a viscosity of 10,000 Pa·s under a pressure of 1 MPa, and $T_B$ is a temperature at which the resin particles exhibit a viscosity of 10,000 Pa·s under a pressure of 10 MPa.

* * * * *